United States Patent [19]
Kurihara et al.

[11] Patent Number: 5,841,475
[45] Date of Patent: Nov. 24, 1998

[54] IMAGE DECODING WITH DEDICATED BIDIRECTIONAL PICTURE STORAGE AND REDUCED MEMORY REQUIREMENTS

[75] Inventors: Kouichi Kurihara; Shuji Abe, both of Kanagawa-ken, Japan

[73] Assignee: Kabushiki Kaisha Toshiba, Kawasaki, Japan

[21] Appl. No.: 548,487

[22] Filed: Oct. 26, 1995

[30] Foreign Application Priority Data

Oct. 28, 1994 [JP] Japan ................................ 6-265834
Oct. 28, 1994 [JP] Japan ................................ 6-265835
Oct. 28, 1994 [JP] Japan ................................ 6-265836

[51] Int. Cl.⁶ .................................................. H04N 7/32
[52] U.S. Cl. ..................................... 348/409; 382/233
[58] Field of Search .......................... 348/416, 415, 348/409, 402, 401, 400, 390, 384; 382/238, 236, 233, 232; H04N 7/137

[56] References Cited

U.S. PATENT DOCUMENTS 5,317,397  5/1994  Odaka et al. ........................... 348/416
5,461,420  10/1995  Yonemitsu et al. .................... 348/401
5,539,466  7/1996  Igarashi et al. ........................ 348/401

FOREIGN PATENT DOCUMENTS 5-91341    4/1993  Japan .
6-98311    4/1994  Japan .
6-338918   12/1994 Japan .
7-212399   8/1995  Japan .

OTHER PUBLICATIONS

P1394 Standard for a High Performance Serial Bus, IEEE Standards, P1394 Draft 8.0v4, Nov. 21, 1995, (Complete Copy with relevant pages circled in Table of Contents).
Kunzman et al., "1394 High Performance Serial Bus: The Digital Interface for ATV", Reprinted with Permission of the IEEE, presented at the International Conference on Consumer Electronics, Chicago, ILL. Jun. 1995.
Hoffman et al., "IEEE 1394: A Ubiquitous Bus", Presented at COMPCON Spring 1995, San Francisco, CA.

*Primary Examiner*—Bryan S. Tung
*Attorney, Agent, or Firm*—Cushman, Darby & Cushman, IP Group of Pillsbury, Madison & Sutro LLP

[57] ABSTRACT

Encoding data are given to a variable-length decoding circuit and are decoded, and are given to a memory so as to be stored therein. The same data are read out from the memory, whereby decoding processing of the encoding data is executed twice within one frame period. Decoding data due to the twice decoding processings are stored in the memory at an output part thereof. Data of odd fields are read out in display order in the first half of the display period of one frame. Data of even fields are read out in display order in the latter half of the display period of one frame. Thus, even in case where restored image data of a B-picture are outputted in interlacing, a memory capacity can be reduced.

6 Claims, 17 Drawing Sheets

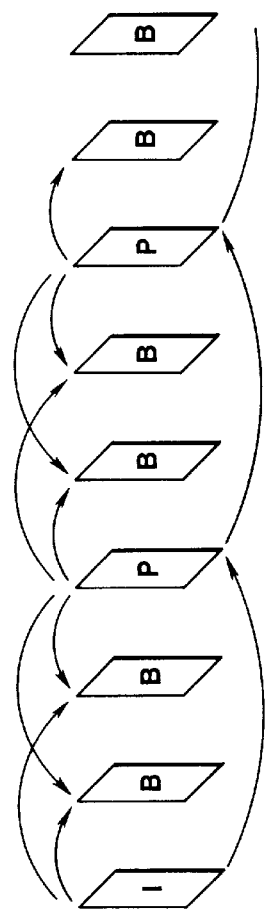
FIG.1A (RELATED ART)
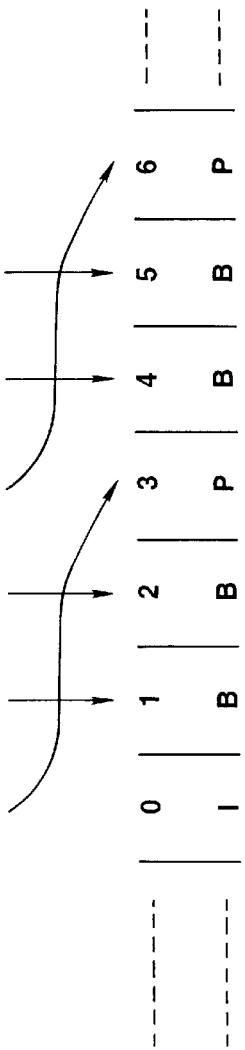
FIG.1B (RELATED ART)
FIG.1C (RELATED ART)

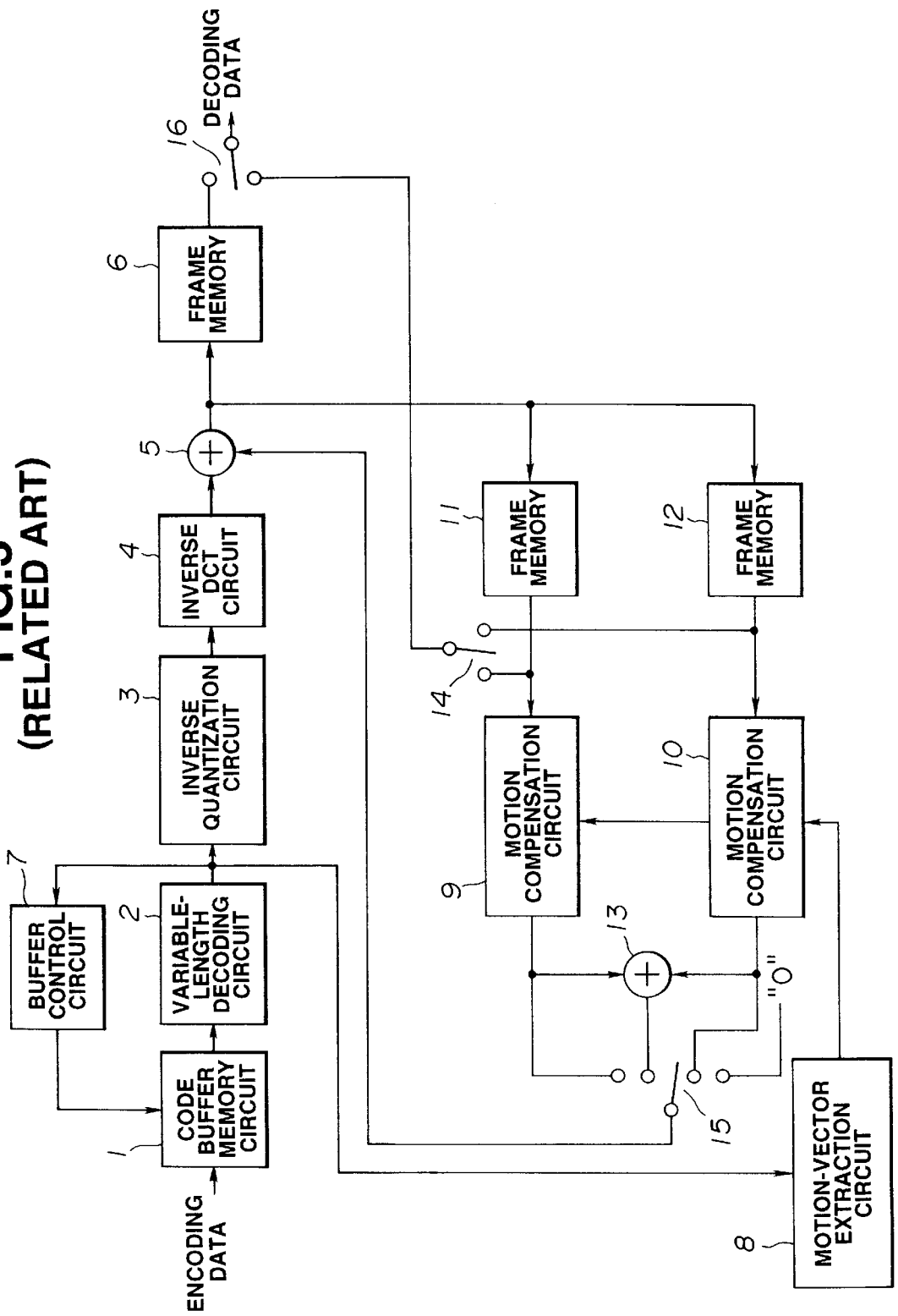

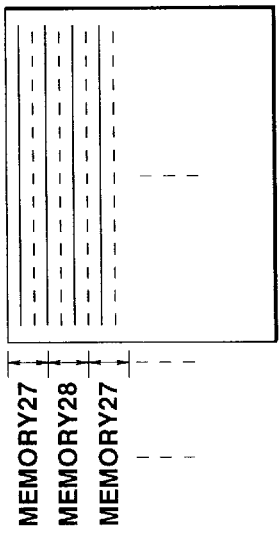
FIG.6A
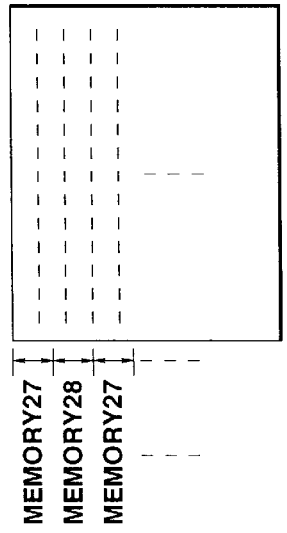
FIG.6C
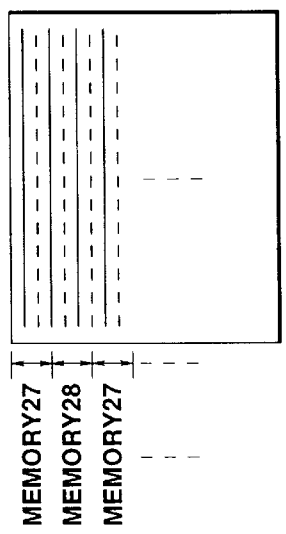
FIG.6B
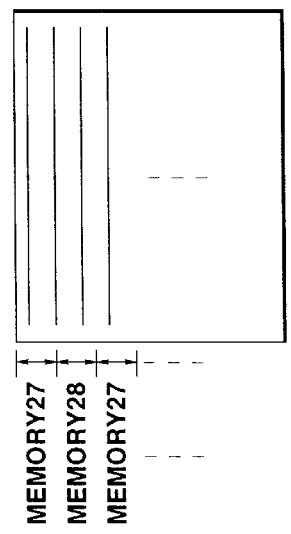
FIG.6D
ONE FRAME TIME

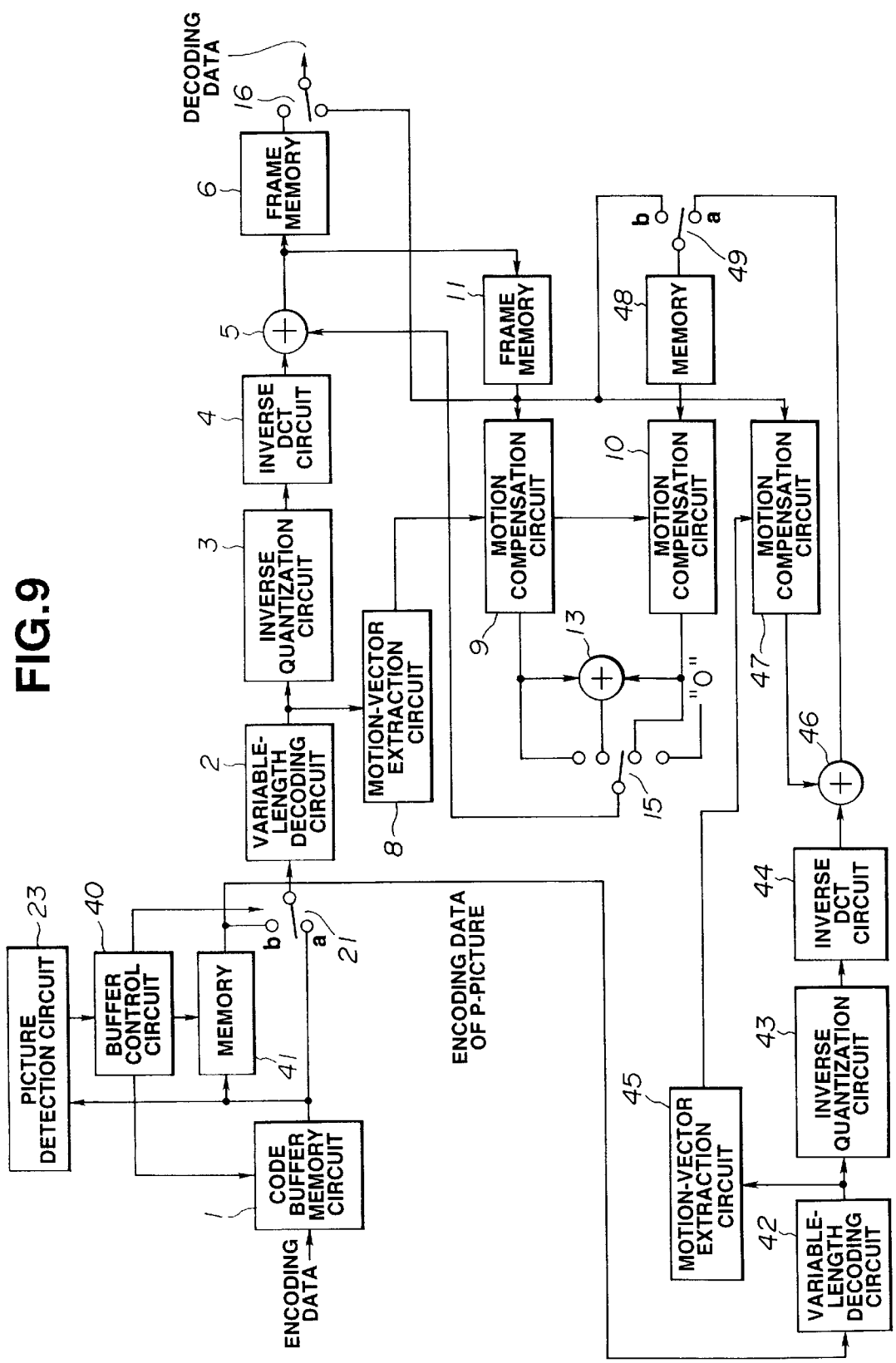

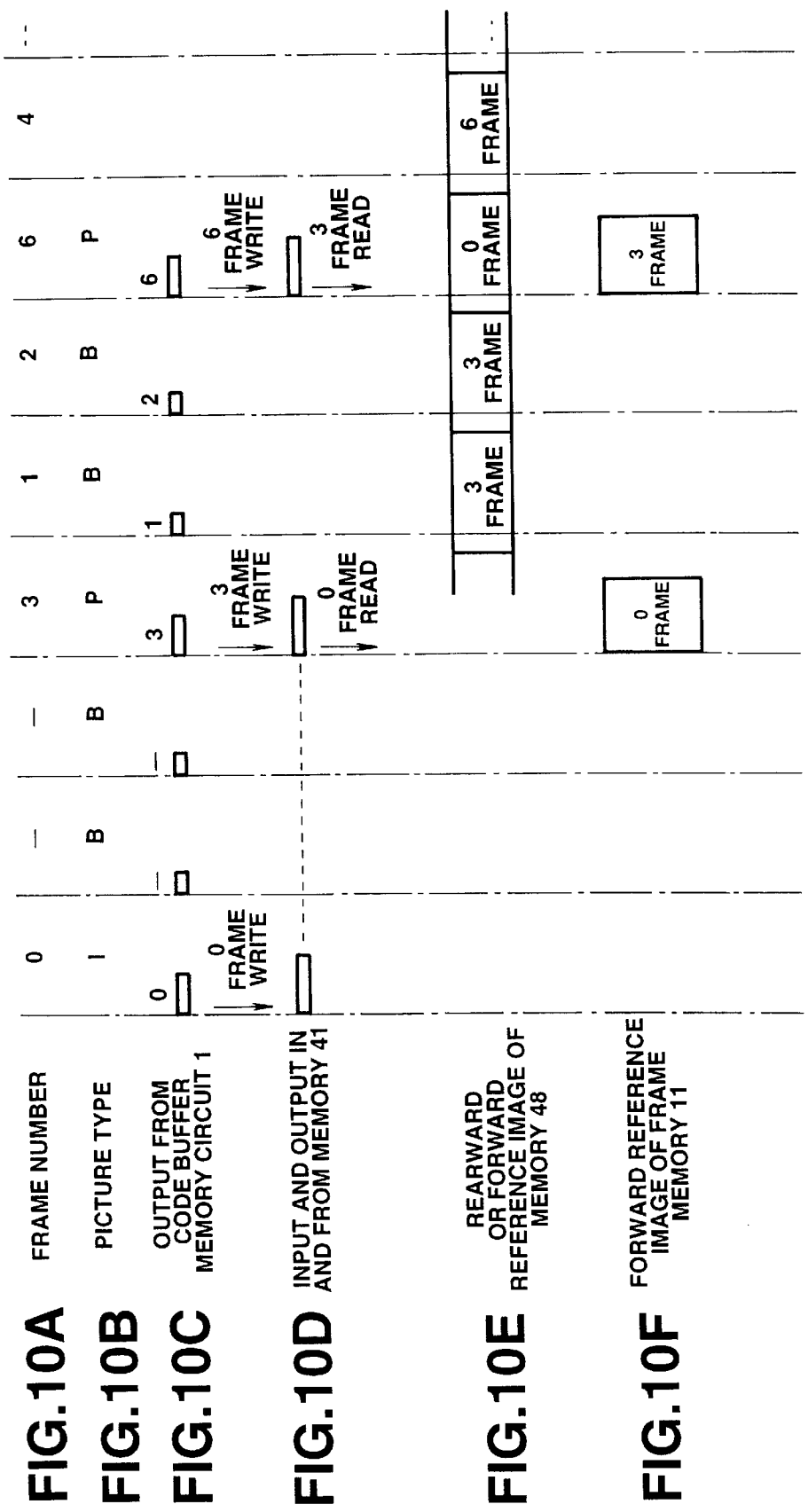

IMAGE DECODING WITH DEDICATED BIDIRECTIONAL PICTURE STORAGE AND REDUCED MEMORY REQUIREMENTS

BACKGROUND OF THE INVENTION

1. Field of the Invention

The present invention relates to an image decoding apparatus for decoding encoding data including bidirectional predictive encoding data.

2. Related Art Statement

In recent years, digital processing of an image has been diffused in keeping with establishment of a high-efficient encoding technique of an image. The high-efficient encoding technique is so arranged as to encode image data by few bit rates, in order to improve efficiency of digital transmission, digital recording and the like. In this high-efficient encoding, orthogonal transformation such as DCT (discrete cosine transformation) processing or the like is executed in block of m×n picture elements. The orthogonal transformation is so arranged as to convert inputted sampled values to orthogonal components such as spatial frequency components or the like. Thus, it is possible to reduce or cut down spatial correlation components. An orthogonal transformation coefficient which is obtained by the orthogonal transformation is quantized so that redundancy thereof is reduced.

Further, variable-length encoding such as Hafman's encoding or the like is applied to a quantization output so that the amount of data is further reduced. The Hafman's encoding is encoding on the basis of the results which are computed from a statistical amount of codes of the quantization output. Short bits are assigned to data which are high in appearance or occurrence probability, while long bits are assigned to data which are low in appearance probability, to thereby reduce the whole amount of data.

Moreover, in an apparatus which executes high efficient encoding, a hybrid system which has been considered in MPEG (Moving Picture Experts Group) or the like has becomes the main current. In this system, in addition to intra-frame compression in which an image within a frame is processed in DCT, inter-frame compression is also utilized in which correlation between the frames is utilized to reduce the redundancy in a direction of a time axis. The inter-frame compression utilizes such property that general animation images well resemble each other in the before and behind frames to find a difference between the before and behind frames to encode a different value (a predictive error), to thereby further reduce the bit rate. Particularly, motion compensation inter-frame predictive encoding is effective in which motion of the image is predicted to find an inter-frame difference or a difference between the frames to thereby reduce the predictive error.

In this manner, in addition to the intra-frame encoding in which the image data of a predetermined frame are processed in DCT as they are and are encoded, the hybrid system employs the predictive encoding in which only the different data between the image data of the predetermined frame and reference image data of the frames before and behind the frame are processed in DCT and are encoded. A predictive encoding method includes forward predictive encoding in which the reference image data in a front direction are compensated in motion in a manner of time to find the predictive error, rearward predictive encoding in which the reference image data in a rearward direction are compensated in motion in a manner of time to find the predictive error and bidirectional predictive encoding which uses either one of the forward image data and the rearward image data or mean or average thereof in both directions, in consideration of encoding efficiency.

Since the frame which is encoded by the intra-frame encoding (hereinafter referred to as "I-picture") is encoded only by intra-frame information, the frame can be decoded only by independent encoding data. Accordingly, in the MPEG standard, in order to prevent error from being propagated, or the like, the arrangement is such that one I-picture is inserted at a fixed cycle or period (12 frames, for example). The MPEG standard obtains an inter-frame encoding frame (hereinafter referred to as "P-picture") by the forward predictive encoding which uses the I-picture. In this connection, the P-picture is obtained also by the fact that a forward P-picture is encoded in forward prediction. Furthermore, a bidirectional prediction adaptive changeover frame (hereinafter referred to as "B-picture") is obtained by bidirectional predictive encoding which uses either one of the forward I- and P-pictures and the rearward I- and P-pictures or the I- and P-pictures in both directions.

FIGS. 1A to 1C of the attached drawings are explanatory views for describing a compressive method of this system. FIG. 1A shows an inputted frame image, and FIG. 1B shows encoding data, while FIG. 1C shows decoding data. Further, FIG. 2 is an explanatory view for describing blocking.

A frame image whose frame number is 0 is encoded in intra-frame. The frame image is used as a reference image, and a frame image whose frame number is 3 is encoded in forward prediction. Arrows in FIG. 1A show predictive directions of such encoding. A frame image whose frame number is 6 is also encoded in forward prediction with the forward frame image whose frame number is 3 serving as a reference image. Moreover, frame images whose frame numbers are 1 and 2 are encoded in bidirectional prediction with the frame images whose frame numbers are 0 and 3 serving as the reference image. Furthermore, frame images whose frame numbers are 4 and 5 are encoded in bidirectional prediction with the frame images whose frame numbers are 3 and 6 serving as the reference image.

Specifically, as shown in FIG. 1B, first, the image data whose frame number is 0 are encoded in intra-frame so that the I-picture is obtained. In this case, the image data whose frame number is 0 are framed by a memory or the like, and, as shown in FIG. 2, are blocked every 8 picture elements×8 lines. The DCT processing is applied to the image data in blocks. In this connection, ODD which is indicated by solid lines in the figure shows scanning lines of odd fields, while EVEN which is indicated by broken lines shows scanning lines of even fields. A DCT conversion coefficient which is obtained by DCT processing is quantized by the use of a predetermined quantization coefficient and, thereafter, variable-length encoding is applied thereto. Thus, the encoding data are obtained.

Subsequently, the inputted frame image whose frame number is 1 is encoded in bidirectional predication by the use of the frame images whose frame numbers are 0 and 3. Accordingly, the inputted frame image whose frame number is 1 is retained in the memory until the frame image whose frame number is 3 is encoded. Similarly, the frame image whose frame number is 2 is also encoded after encoding of the frame image whose frame number is 3. Regarding the frame image whose frame number is 3, the forward prediction encoding is executed which uses the frame image whose frame number is 0, as the reference image, so that the P-picture is obtained (FIG. 1B). Specifically, the image data whose frame number is 0 are compensated in motion by the use of a motion vector, and a difference between the reference image data which are compensated in motion and the image data of the present frame (frame whose frame number is 3) (predicative error) is processed in DCT. The fact that the DCT conversion coefficient is encoded in variable length after having been quantized is similar to that upon the intra-frame encoding.

Subsequently, the I-picture and the P-picture whose frame numbers are 0 and 3, which have already been encoded, are used so that the frame images whose frame numbers are 1 and 2 are successively encoded in bidirectional prediction. In this manner, as shown in FIG. 1B, two B-pictures are obtained. Subsequently, similarly, as shown in FIG. 1B, encoding is executed in order of the frame images whose frame numbers are 6, 4, 5, . . . so that the P-picture, the B-picture, B-picture, . . . are obtained.

In this manner, upon encoding, encoding is executed in frame order which is different from frame order which is practically inputted. Upon decoding, it is necessary that the decoding order of the encoding data is returned to an original one so that decoding data are outputted in order of the fact that the frame numbers are 0, 1, 2, . . .

FIG. 3 is a block diagram which shows a related technique of such image decoding apparatus. Moreover, FIGS. 4A and 4B are explanatory views for describing the framing. FIG. 4A shows framing upon non-interlaced scanning, while FIG. 4B shows framing upon interlaced scanning.

Encoding data are inputted into a code buffer memory circuit 1. The encoding data are ones in which image data or the predictive error are or is processed in DCT and are or is quantized and, thereafter, are or is encoded in variable length, in encoding order illustrated in FIG. 1B. The code buffer memory circuit 1 retains the inputted encoding data. The code buffer memory circuit 1 executes time setting between decoding processing time and output processing time to output the same to a variable-length decoding circuit 2. The variable-length decoding circuit 2 decodes, in variable length, the encoding data to output the same to an inverse- or reverse-quantization circuit 3 and a buffer control circuit 7. Writing and readout of the code buffer memory circuit 1 are controlled by the buffer control circuit 7.

An output from the variable-length decoding circuit 2 is inverse-quantized by the inverse-quantization circuit 3. The output from the variable-length decoding circuit 2 is processed in inverse DCT by an inverse DCT circuit 4 and is returned to data prior to the DCT processing on the side of the encoding. Now, it is supposed that the I-picture that is the encoding data whose frame number is 0 is inputted. In this case, an output from the inverse DCT circuit 4 is a restored image whose frame number is 0. The output from the inverse DCT circuit 4 is given to a frame memory 6 as it is.

The output from the inverse DCT circuit 4 is picture element data in blocks, and the frame memory 6 retains the picture element data corresponding to a single frame. In case where the non-interlaced display is executed, as shown in FIG. 4A, the frame memory 6 arranges the output from the inverse DCT circuit 4 in frame order, and outputs the same in order of rasters. Moreover, in case where the interlaced display is executed, as shown in FIG. 4B, the frame memory 6 arranges the output from the inverse DCT circuit 4 in division into data of odd fields and data of even fields, and outputs the same in order of rasters every each field. An output from the frame memory 6 is outputted through a switch 16 as decoding data (FIG. 1C). The restored image data from the inverse DCT circuit 4 in which the frame number is 0 are also supplied to a frame memory 12 in order for decoding of the P- and B-pictures.

In connection with the above, if, in case where the DCT block is blocked after the framing, the non-interlaced display is executed, it is unnecessary to vary or change the picture element arrangement in a line direction. Accordingly, the memory which modifies the output order may have a capacity thereof which retains data corresponding to 8 lines (one block line). However, in order to enable the interlaced display, it is necessary to divide the data into the odd fields and the even fields to output the data. Accordingly, further many memories will be necessary. For this reason, generally, there are many cases that a frame memory is adopted as the memory for modifying the display order so that the framing is executed.

Subsequently, the P-picture whose frame number is 3 is decorded. In this case, the output from the inverse DCT circuit 4 is the predictive error. Meanwhile, a motion-vector extraction circuit 8 extracts a motion vector which is included in the output from the variable-length decoding circuit 2, to give the same to a motion compensation circuit 10. The motion compensation circuit 10 reads the restored image data of the I-picture from the frame memory 12, to compensate, in motion, the same by the use of the motion vector. An output from the motion compensation circuit 10 is given to an adder 5 through a switch 15. The adder 5 adds the restored image data whose frame number is 0, which is compensated in motion, and the predictive error from the inverse DCT circuit 4 to each other, to obtain restored image data whose frame number is 3. The data are supplied to a frame memory 11.

Subsequently, the B-picture whose frame number is 1 is decorded. Also in this case, the output from the inverse DCT circuit 4 is the predictive error. The motion-vector extraction circuit 8 extracts a motion vector between the image whose frame number is 3 and the image whose frame number is 1, from the variable-length decoded output to give the same to a motion compensation circuit 9. The motion compensation circuit 9 uses the motion vector to compensate in motion the restored image data whose frame number is 3, from the frame memory 11 to thereby output the same to an adder 13. The adder 13 adds outputs from the motion compensation circuits 9 and 10 to each other in accordance with the predictive mode upon encoding to supply the same to the adder 5 through the switch 15. The adder 5 adds the output from the switch 15 to the predictive error, to obtain the restored image data of the B-picture whose frame number is 1. The image data are given to the frame memory 6 and are framed and, subsequently, are outputted through the switch 16 (FIG. 1C).

Subsequently, the B-picture whose frame number is 2 is decorded. Also in this case, the output from the inverse DCT circuit 4 and the output from the switch 15 are added to each other so that the restored image data of the B-picture whose frame number is 2 are obtained. The image data are given to the frame memory 6 and are framed and, subsequently, are outputted through the switch 16 (FIG. 1C). Subsequently, as shown in FIG. 1C, the restored image data whose frame number is 3, which are stored in the frame memory 11 are outputted as decoding data through a switch 14 and the switch 16 in display order.

Subsequently, similar operation is repeated, and the image data (decoding data) which are restored in decoding order in FIG. 1C are outputted. In this connection, the decoding processing and the output processing are controlled while consideration is paid to the amount of overlap between the memory and the operation time within the system.

In this manner, the P-picture is decoded by the use of the reference image of the forward frame, and the memory corresponding to the single frame for retaining the reference image is necessary for the decoding. Further, the B-picture is decoded by the use of the reference image of the forward and rearward frames, and the memory corresponding to the two frames for retaining these reference images is necessary. Moreover, in view of the fact that the encoding processing is executed in the DCT block, as described above, a memory corresponding to a single frame is necessary which flames the output from the adder 5 to enable the interlaced display or the non-interlaced display. In this case, the decoding data of the I- and P-pictures are stored in the frame memories 11 and 12 in order to be used as the reference image of the B-picture. Readout from these memories 11 and 12 is controlled and is outputted whereby it is possible to use these frame memories 11 and 12 both for the framing. Since, however, the decoding data of the B-picture are not used as those for the reference image and are not stored in the frame memories 11 and 12, it is necessary to provide the frame memory 6 in order for the framing.

In this manner, in order to decode the image encoding data including the B-picture, many number of memories are necessary. This increases the circuit scale, and raises the cost.

OBJECTS AND SUMMARY OF THE INVENTION

An object of the present invention is to provide an image decoding apparatus in which memories which are necessary for decoding image encoding data including a B-picture are reduced to reduce a circuit scale so that the cost can be reduced.

An image decoding apparatus according to the invention comprises decoding means to which encoding data including bidirectional predictive encoding data which use forward and rearward reference images are inputted, for decoding the inputted encoding data in redetermined blocks, to output decoding data, memory means for retaining said inputted bidirectional predictive encoding data, control means for successively giving said inputted bidirectional predictive encoding data and said bidirectional predictive encoding data which are stored in said memory means, to said decoding means, to cause twice decoding processings to be executed regarding the same bidirectional predictive encoding data, first output means for retaining the decoding data, corresponding at least to one block line, due to the first decoding processing regarding said bidirectional predictive encoding data from said decoding means and for outputting, in order of display, the decoding data of one field of the retained decoding data, and second output means for retaining the decoding data, corresponding at least to one block line, due to the second decoding processing regarding said bidirectional predictive encoding data from said decoding means and for outputting, in order of the display, the decoding data of the other field of the retained decoding data.

Further, an image decoding apparatus according to the invention comprises first memory means to which encoding data including bidirectional predictive encoding data which use forward and rearward reference images are inputted, for storing the inputted encoding data, first decoding means for decoding, in predetermined blocks, one of said inputted encoding data and the encoding data which are read out from said first memory means, to output decoding data, second memory means capable of storing the decoding data from said first decoding means as reference-image data, second decoding means for processing in decoding the encoding data which are read out from said first memory means, by the use of the reference-image data which are stored in said second memory means, to thereby create reference-image data of the encoding data which are decoded by said first decoding means, third memory means for storing the reference-image data from said second decoding means at least only within a range capable of executing the decoding processing of said first decoding means so as to be capable of outputting the same as reference-image data in the decoding processing of said first decoding means, and fourth memory means for storing decoding data with respect to said bidirectional predictive encoding data from said first decoding means to frame the same, to thereby output the same in order of display.

Moreover, an image decoding apparatus according to the invention comprises first memory means to which encoding data including bidirectional predictive encoding data which use forward and rearward reference images are inputted, for storing inputted encoding data, first decoding means for decoding, in redetermined blocks, one of said inputted encoding data and encoding data which are read out from said first memory means, to output decoding data, second memory means capable of storing the decoding data from said first decoding means, as reference-image data, detection means for detecting blocks of the reference image which are necessary for decoding said encoding data in predetermined blocks by said first decoding means, second decoding means for reading out data of blocks assigned by said detection means from said first memory means to process, in decoding, the same by the use of the reference-image data which are stored in said second memory means, to thereby create reference-image data of the encoding data which are decoded by said first decoding means, third memory means for storing the reference-image data from said second decoding means so as to be capable of being outputted as reference-image data in the decoding processing of said first decoding means, and fourth memory means for storing decoding data with respect to said bidirectional predictive encoding data from said first decoding means to frame the same to thereby output the same in order of display.

Other characteristics and advantages of the present invention will become further apparent from the following detailed explanation.

BRIEF DESCRIPTION OF THE DRAWINGS

FIGS. 1A–1C are explanatory views for describing a compressive method of a hybrid system;

FIG. 3 is a block diagram showing the related technique of an image decoding apparatus;

FIGS. 6A to 6D are explanatory views for describing memory regions of memories 27 and 28 in FIG. 5;

FIG. 9 is a block diagram showing another embodiment of the invention;

FIGS. 10A–10F are timing charts for describing operation of the embodiment;

DETAILED DESCRIPTION OF THE PREFERRED EMBODIMENTS

Figure 2:
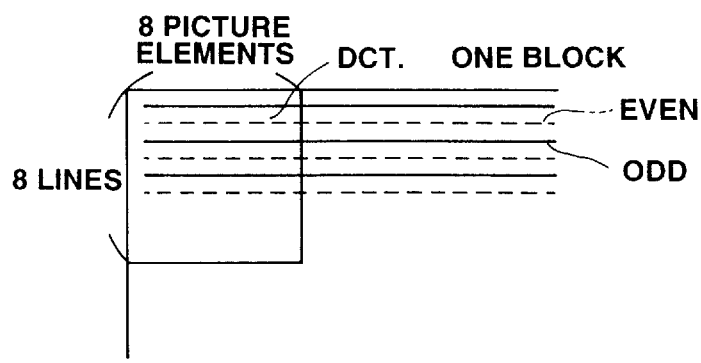
FIG. 2 is an explanatory view for describing blocking.
Figure 4A:
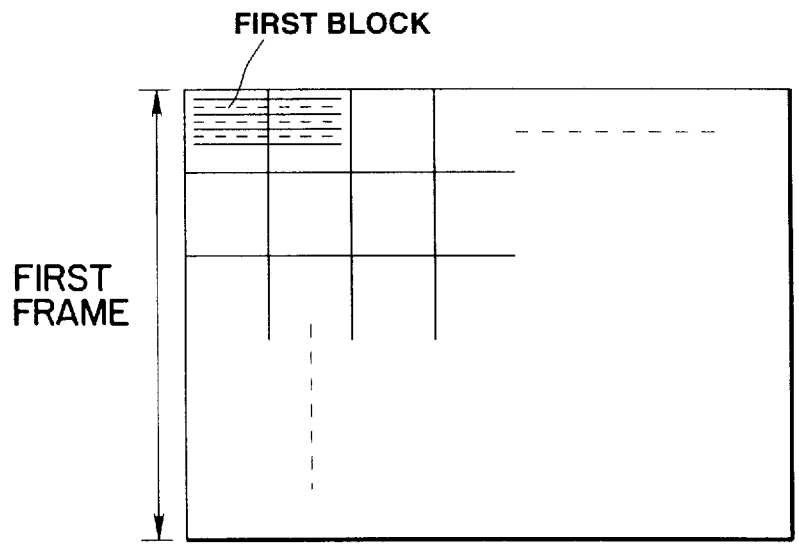
FIGS. 4A and 4B are explanatory views for describing framing.
Figure 4B:
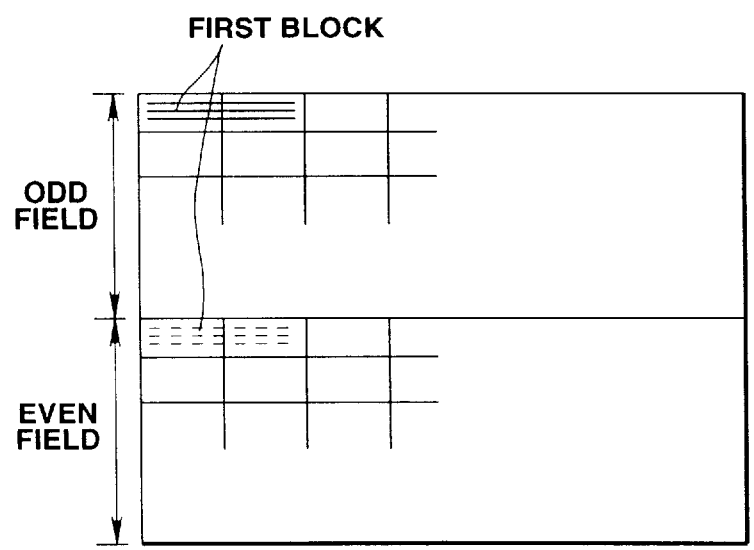
Figure 5:
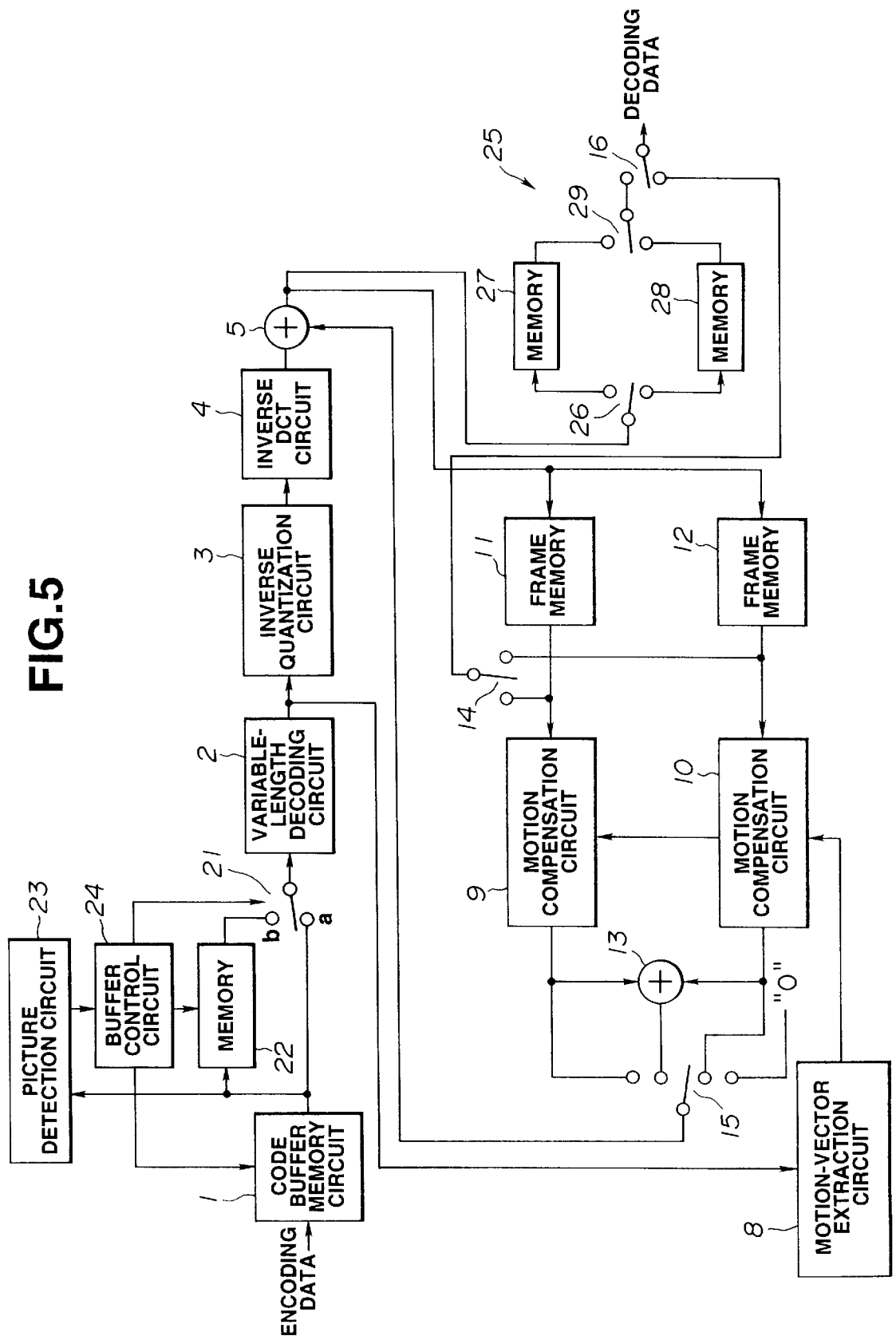
FIG. 5 is a block diagram showing an embodiment of an image decoding apparatus according to the invention.

FIG. 5 is a block diagram showing an embodiment of an image decoding apparatus according to the invention. In FIG. 5, the same reference numerals are applied to constitutional elements which are the same as those in FIG. 3. The present embodiment is so arranged as to decode encoding data to output decoded data in order of display of interlaced display.

The encoding data are supplied to the code buffer memory circuit 1. The encoding data are created by DCT processing, quantization processing and variable-length coding processing, and have an I-picture due to processing within a frame, a P-picture which uses a reference image of a forward or a rearward frame, and a B-picture which uses a reference image of a bidirectional frame. Further, the encoding data also include information of a motion vector which is used upon creation of the P- and B-pictures. In this connection, the DCT processing is executed in block data which are obtained by blocking processing after framing.

The code buffer memory circuit 1 retains inputted encoding data. The code buffer memory circuit 1 executes time setting between decoding processing time and output processing time to output the same. In the present embodiment, an output from the code buffer memory circuit 1 is so arranged as to be supplied to a terminal a of a switch 21, a memory 22 and a picture detection circuit 23. The picture detection circuit 23 detects a picture type of the inputted encoding data to output a detection signal to a buffer control circuit 24.

The buffer control circuit 24 controls writing and readout of the code buffer memory circuit 1 on the basis of the detection signal. Moreover, in case where it is indicated by the detection signal that the B-picture is inputted, the buffer control circuit 24 generates a writing address for storing the inputted encoding data of the B-picture to the memory 22 and causes the switch 21 to select the terminal a, to supply an output from the code buffer memory circuit 1 to a variable-length decoding circuit 2. Furthermore, if decoding with respect to the B-picture from the code buffer memory circuit 1 terminates, the buffer control circuit 24 gives a readout address to the memory 22 and causes the switch 21 to select a terminal b so that the encoding data of the B-picture which are stored in the memory 22 are supplied to the variable-length decoding circuit 2. In this connection, in case where the inputted encoding data are I- and P-pictures, the buffer control circuit 24 causes the switch 21 to select the terminal a. The memory 22 stores therein the encoding data of the B-picture. In this connection, an amount of codes of the B-picture is sufficiently lower than an amount of codes of the I-picture, and may have a capacity of about ¼ the frame memory which retains picture element data.

The encoding data are given to the variable-length decoding circuit 2 through the switch 21. The variable-length decoding circuit 2 returns the encoding data to data prior to the variable-length encoding processing on the side of encoding, by variable-length decoding processing and outputs a variable-length decoding output to the inverse quantization circuit 3 and the motion-vector extraction circuit 8. The motion-vector extraction circuit 8 extracts a motion vector which is included in a variable-length decoding output, regarding the P- and B-pictures, to output the same to the motion compensation circuits 9 and 10. The inverse quantization circuit 3 processes, in inverse quantization, the inputted data to give the same to the inverse DCT circuit 4. The inverse DCT circuit 4 processes, in inverse DCT, an inverse quantization output to output the same to the adder 5.

An output from the switch 15 is also given to the adder 5. In case where the output from the inverse DCT circuit 4 is based on the I-picture, the switch 15 gives 0 to the adder 5. While, in case where the output from the inverse DCT circuit 4 is based on the P-picture, the switch 15 gives the output from one of the motion compensation circuits 9 and 10 to be described subsequently to the adder 5. In case where the output from the inverse DCT circuit 4 is based on the B-picture, the switch 15 gives the outputs from the motion compensation circuits 9 and 10 or the output from the adder 13 to be described subsequently, to the adder 5. The adder 5 adds the output from the inverse DCT circuit 4 and the output from the switch 15 to each other to thereby restore the image, to output the same to the frame memories 11 and 12 and to output the same to memories 27 and 28 through a switch 26 of an output part 25.

The outputs from the memories 27 and 28 are outputted to the switch 16 through a switch 29. The switches 26 and 29 are changed over in interlocking with each other. In case where writing of the memory 27 is executed through the switch 26, readout of the data is executed from the memory 28 through the switch 29. In case where writing is executed to the memory 28, readout of the data is executed from the memory 27. Each of the memories 27 and 28 has a capacity which retains picture element data of a single block line.

The frame memories 11 and 12 retain restored image data of the I- and P-pictures which become the reference image. The frame memories 11 and 12 are so arranged as to output the reference-image data retained at decoding timing of the corresponding P- and B-pictures, to the motion compensation circuits 9 and 10. The motion compensation circuits 9 and 10 compensate, in motion, the reference-image data respectively from the frame memories 11 and 12, on the basis of the motion vector from the motion-vector extraction circuit 8 to output the same. The outputs from the motion compensation circuits 9 and 10 are supplied to the switch 15, and are also supplied to the adder 13. The adder 13 adds the outputs from the motion compensation circuits 9 and 10 to each other in accordance with a predictive mode, to output the same to the switch 15.

Further, the switch 14 is changed over in accordance with the output frame order of the image, to output the restored image data which are stored in the frame memories 11 and 12, to the switch 16. The switch 16 is so arranged as be to changed over in accordance with the output frame order of the image, to output the sequential restored image data of the frame, as the decoding data.

In the present embodiment, the variable-length decoding circuit 2, the inverse quantization circuit 3, the inverse DCT circuit 4, the adder 5, the motion-vector extraction circuit 8, the motion compensation circuits 9 and 10, the frame memories 11 and 12, the adder 13 and the switch 15 are so arranged as to be capable of executing twice decoding processings regarding the B-picture within the image display time of one frame. For example, regarding the NTSC image, generally, sampling frequency is set to 13.5 MHz. Accordingly, in case where encoding data of the NTSC image are decoded, a clock of 27 MHz should be used to execute the decoding processing. If the present operation rate or speed of an integrated circuit is considered, these circuits which are used in the decoding processing may be the same as conventional ones.

Subsequently, operation of the embodiment arranged in this manner will be described with reference to FIGS. 6A~6D. FIGS. 6A~6D are explanatory views for describing writing and readout of memories 27 and 28 in FIG. 1. FIG. 6A and 6B show writing and readout upon first decoding, while FIG. 6C and 6D show writing and readout upon second decoding. In this connection, in FIGS. 6A~6D, the data of the odd fields are shown by the solid line, while the data of the even fields are shown by the broken line.

The encoding data are supplied to the code buffer memory circuit 1. The encoding data have the I-, P- and B-pictures. It is supposed, for example, that the encoding data are inputted in the frame order in FIG. 1B. In consideration of the encoding processing time and the output time, the code buffer memory circuit 1 retains the inputted encoding data to output the same to the terminal a of the switch 21 and the picture detection circuit 23. First, as shown in FIG. 1B, it is supposed that the encoding data of the I-picture whose frame number is 0 are inputted. The picture detection circuit 23 detects that the inputted encoding data are the I-picture, to output the detection signal to the buffer control circuit 24. Thus, the buffer control circuit 24 controls the code buffer memory circuit 1, and causes the switch 21 to select the terminal a.

The encoding data of the I-picture which are delayed by the code buffer memory circuit 1 are given to the variable-length decoding circuit 2 through the switch 21 so as to be decoded in variable length. Moreover, the encoding data are inverse-quantized by the inverse quantization circuit 3, and arc processed in inverse DCT by the inverse DCT circuit 4. The encoding data arc returned to the data before the DCT processing on the encoding side so as to be outputted to the adder 5. In this case, the output from the inverse DCT circuit 4 is a restored image whose frame number is 0. In this connection, these processings are executed in blocks. The switch 15 gives 0 to the adder 5. The adder 5 gives the output from the inverse DCT circuit 4, to the frame memory 12 as it is.

The decoding data in each block are stored correspondingly to one frame by the frame memory 12. The decoding data are read out in the display order, at predetermined output timing and are outputted through the switches 14 and 16.

The encoding data of the P-picture whose frame number is 3 are subsequently inputted to the code buffer memory circuit 1. The picture detection circuit 3 outputs the detection signal indicating that the P-picture is inputted, to the buffer control circuit 24. The buffer control circuit 24 causes the switch 21 to select the terminal a. The encoding data of the P-picture which are delayed through predetermined time by the code buffer memory circuit 1 are supplied to the variable-length decoding circuit 2 through the switch 21 so as to be decoded in variable length. The output from the variable-length decoding circuit 2 is returned to the data before the DCT processing, by the inverse quantization circuit 3 and the inverse DCT circuit 4, and is given also to the motion-vector extraction circuit 8. The motion vector which is included in the encoding data of the P-picture is extracted by the motion-vector extraction circuit 8 and is given to the motion compensation circuit 10.

The frame memory 12 retains the decoding data of the I-picture whose frame number is 0, as a reference image. The motion compensation circuit 10 reads out the data in the frame memory 12 and compensates, in motion, the data by the use of the motion vector. Specifically, the motion compensation circuit 10 corrects the blocking position which corresponds to the decoding data of the predetermined block which are outputted from the inverse DCT circuit 4, by the motion vector, and outputs the block data at the corrected blocking position as the reference-image data which are compensated in motion. The data of the reference image which are compensated in motion are given to the adder 5 through the switch 15. The output from the inverse DCT circuit 4 is the decoded predictive error. The adder 5 adds the data of the reference image from the switch 15, to the predictive error, to thereby restore the image data whose frame number is 3. The image data are stored in the frame memory 11.

Subsequently, the encoding data of the B-picture whose frame number is 1 are inputted to the code buffer memory circuit 1. The picture detection circuit 23 outputs a detection signal indicating that the encoding data of the B-picture are inputted, to the buffer control circuit 24. Then, the buffer control circuit 24 outputs the encoding data of the B-picture from the code buffer memory circuit 1 to the variable-length decoding circuit 2 through the switch 21, and gives the same also to the memory 22 so as to be stored.

In the present embodiment, regarding the B-picture, twice decoding processings are executed within an image display period of the one frame. The variable-length decoding circuit 2 decodes, in variable length, the encoding data of the B-picture, and the variable-length decoding output is returned to the original picture-element data by the inverse quantization circuit 3 and the inverse DCT circuit 4. Meanwhile, the motion-vector extraction circuit 8 extracts the motion vectors which correspond to the reference images whose frame numbers are 0 and 3, from the variable-length decoding output, to output the same to the motion compensation circuits 10 and 9. In this connection, there is also case where only either one of the motion vectors is extracted, depending upon the predictive mode.

The frame memories 12 and 11 retain the restored image data whose frame numbers are 0 and 3, as the reference-image data. The motion compensation circuits 9 and 10 read out these restored image data, to compensate, in motion, the same on the basis of the motion vector to output the same to the switch 15 and the adder 13. The adder 13 adds the outputs from the motion compensation circuits 9 and 10 to each other to output the same to the switch 15. The switch 15 selects the output from the motion compensation circuit 10 in case where the predictive direction is forward, while the switch 15 selects the output from the motion compensation circuit 9 in case where the predictive direction is rearward. In case where the predictive directions are both directions, the switch 15 selects the output form the adder 13 to output the same to the adder 5 as the reference-image data which are compensated in motion.

Thus, the adder 5 adds the block data from the inverse DCT circuit 4 and the reference-image data in blocks from the switch 15 to each other, to thereby restore the image data whose frame number is 1, in blocks, to output the same to the switch 26.

The switches 26 and 29 are changed over every one block line. Specifically, the block data from the adder 5 are stored alternately in the memories 27 and 28 every one block line. Moreover, readout from the memories 27 and 28 is also changed over simultaneously with writing. For example, as shown in FIG. 6A, in case where data at the first block line uppermost in the image plane are written to the memory 27, each block data of the subsequent one block line (second block line) from the adder 5 are written to the memory 28. Simultaneously with writing of the block data in the second block line to the memory 28, the data of the odd field in the first block line are read out from the memory 27 in the display order and are outputted through the switch 29. Similarly, each block data in the third block line from the adder 5 are written to the memory 27 and, simultaneously, the data of the odd field on the second block line are read out from the memory 28 in the display order and are outputted through the switch 29.

Subsequently, similar operation is repeated. As shown in FIG. 6B, the decoding data of the odd fields are successively outputted through the switches 29 and 16 in the display order. As described above, the decoding processing of the B-picture can be executed within time ½ the display time of the one frame. The decoding data of the odd fields are outputted at time of one field. Thus, the image data of the odd field of the interlaced display are obtained.

Meanwhile, when the first decoding processing with respect to the B-picture whose frame number is 1 has been completed, the buffer control circuit 24 causes the switch 21 to select the terminal b to give the encoding data of the B-picture whose frame number is 1, which are stored in the memory 22, to the variable-length decoding circuit 2. In this case, processing similar to the first decoding processing is executed. The adder 5 successively outputs the decoding data of the B-picture whose frame number is 1, in blocks.

Each block data of the first block line from the adder 5 are successively written to the memory 27 through the switch 26, as shown in FIG. 6C. Each block data of the subsequent second block line are successively written to the memory 28. Simultaneously with the writing, the picture element data of the even fields on the first block line from the memory 27 are successively read out in the display order. Subsequently, similar operation is repeated. As shown in FIG. 6D, the picture element data of the even field are read out in the display order, and are outputted through the switches 29 and 16. The output of the decoding data of the even fields is executed at time which is ½ the latter half of the display time of the one frame. Thus, it is possible to obtain the decoding data of the even fields of the interlaced display.

Subsequently, also regarding the encoding data of the B-picture whose frame number is 2, the encoding processing is executed twice within the display period of one frame. The decoding data of the B-picture whose frame number is 2 are divided into the odd fields and the even fields to output the decoding data. Subsequently, the restored image data whose frame number is 3, which are stored in the frame memory 11 are read out in the display order and are outputted through the switches 14 and 16. Subsequently, similar operation is repeated whereby the decoding data in FIG. 1C are obtained.

In this manner, in the present embodiment, the decoding processing of the B-picture is executed twice within the image display time of the one frame. The block data which are obtained by the first decoding processing are stored in the memory one block Line by one block line, to read out only the data of the odd fields in the display order, to thereby obtain the decoding data of the odd fields of the interlacing. Similarly, the block data which are obtained by the second decoding processing are stored in the memory one block line by one block line, to read out only the data of the even fields, to thereby obtain the decoding data of the even fields of the interlacing. Accordingly, it is sufficient that each of the memories 27 and 28 has the capacity corresponding to one block line. Specifically, the total capacity of the memories 22, 27 and 28 may be relatively small. It is possible to reduce the memory capacity required for decoding, as compared with the conventional one. Thus, an attempt can be made to reduce the circuit scale to reduce the cost.

In connection with the above, in the present embodiment, in order to clear the operation that the B-picture is decoded twice, the code buffer memory circuit 1 which retains the inputted encoding data and the memory 22 which stores therein the encoding data of the B-picture have been described as being memories different from each other. However, since the inputted encoding data of the B-picture are retained once in the code buffer memory circuit 1, it is also possible to realize the present embodiment by the fact that this is read twice.

In connection with the above, essentially, as described above, the decoding of the one picture should be completed within the one field time. In the present embodiment, however, since each of the memory 27 and the memory 28 has only the capacity thereof which retains the picture-element data of the one block line, the decoding processing corresponding to the one block line should be completed within the one block line time.

By the way, since the encoding data are variable in length, there exist the block in which the amount of codes is many and the block in which the amount of codes is less. For this reason, there is case where the block line exists in which the amount of codes is extremely many. Regarding this block line, there is case, depending upon the used memory, where the decoding completion processing time is not put down or is not settled within the one block line time in view of the limitation of the access time of the memory.

In view of the above, if the following method, for example, is executed, it is possible to secure the decoding processing time long. Specifically, the memory 27 and the memory 28 are replaced by a single field memory. One field of the decoding data is retained in this field memory upon the first decoding processing of the B-picture. Upon the second decoding processing, the one field which is retained upon the first decoding is read out. While it is outputted in the display order, the other field of the decoding data which are obtained by the second decoding processing is successively retained in the read-out region. Thus, the decoding data of the one and the other fields are outputted in the display order.

According to this method, the memory capacity increases more than that which is described in the embodiment. However, a problem of the decoding processing time due to the memory access speed is solved, and it is possible to reduce the memory capacity as compared with a conventional or prior-art example.

Figure 7:
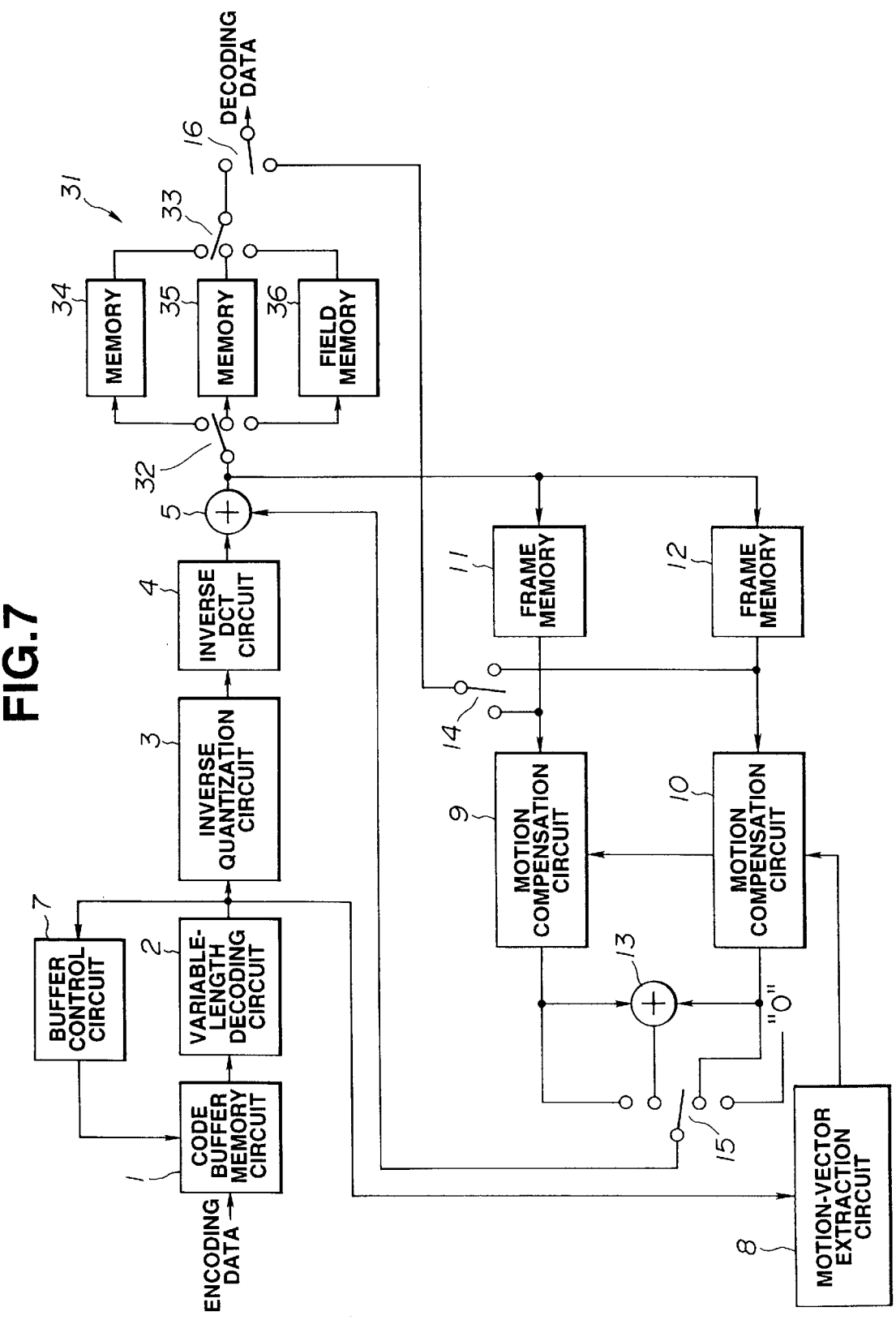
FIG. 7 is a block diagram showing another embodiment of the invention.

FIG. 7 is a block diagram showing another embodiment of the invention. In FIG. 7, the same reference numerals are applied to constitutional elements the same as those in FIG. 5, and the description thereof will be omitted.

The present embodiment is different from the embodiment shown in FIG. 5 in that the present embodiment reduces the switch 21, the memory 22, the picture detection circuit 23 and the buffer control circuit 24, adopts the buffer control circuit 7, and adopts an output part 31 in place of the output part 25. The output from the code buffer memory circuit 1 is given to the variable-length decoding circuit 2, and the output from the variable-length decoding circuit 2 is given to the buffer control circuit 7. The buffer control circuit 7 is adapted to control the code buffer memory circuit 1 on the basis of the variable-length decoding output from the variable-length decoding circuit 2.

An output part 31 is formed by switches 32 and 33, memories 34 and 35 and a field memory 36. In case where block data of block line at the odd numbers are outputted from the adder 5, the switch 32 alternately selects the memory 34 or the field memory 36 every lines. In case where block data of block line at the even numbers are outputted from the adder 5, the switch 32 alternately selects the memory 35 or the field memory 36 every lines. The arrangement is such that the switch 32 gives the data of the odd fields of the block data, to the memories 34 and 35, and gives the data of the even fields to the field memory 36. Specifically, the memory 34 is adapted to store the data of the odd fields at the odd numbers corresponding to the one block. The memory 35 is adapted to store the data of the odd fields at the even numbers corresponding to the one block. The field memory 36 is adapted to store the data of the even fields corresponding to the one field. The switch 33 selects the memory 35 in case where the switch 32 selects the memory 34, and selects the memory 34 in case where the switch 32 selects the memory 35 in the display time of the odd fields. Further, the switch 33 is adapted to select the output from the field memory 36 at the display time of the even fields.

In connection with the above, in the present embodiment, regarding the B-picture, it is necessary to execute the decoding processing within the time ½ the image display time of the one frame, similarly to the embodiment in FIG. 1. However, the decoding processing may only be once.

Figure 8A:
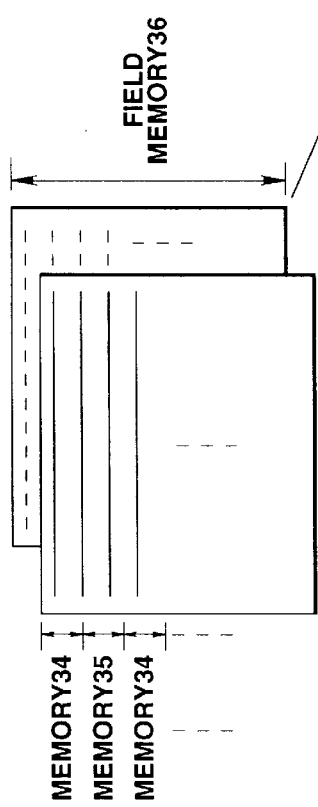
FIGS. 8A–8C are explanatory views for describing writing and readout of memories 34 and 35 and a field memory 36 in FIG. 7.
Figure 8C:
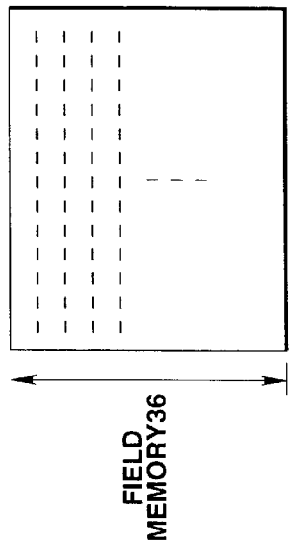
Figure 8B:
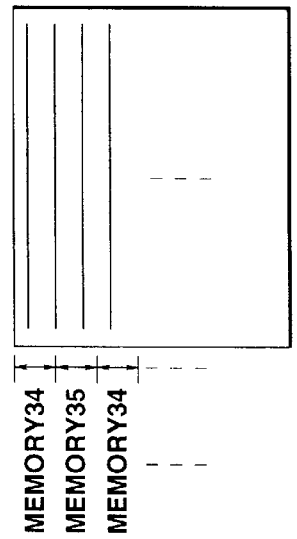

Subsequently, operation of the embodiment arranged in this manner will be described with reference to FIGS. 8A~8C. FIGS. 8A~8C are explanatory views for describing writing and readout of the memories 34 and 35 and the field memory 36 in FIG. 7. FIG. 8A shows writing of the block data, while FIGS. 8B and 8C show readout of the decoding data in the odd fields and the even fields. In this connection, in FIGS. 8A~8C, the data of the odd fields are shown by the solid line, while the data of the even fields are shown by the broken line.

Encoding data which are similar to those of the embodiment in FIG. 5 are inputted to the code buffer memory circuit 1. The code buffer memory circuit 1 is controlled by the buffer control circuit 7 to delay the encoding data which are inputted by the delay amount on the basis of the encoding processing time and the output time, to thereby output the same to the variable-length decoding circuit 2. Decoding processing subsequent to the variable-length decoding circuit 2 is similar to that in the embodiment illustrated in FIG. 5. Moreover, it is also similar to that of the embodiment in FIG. 5 that the decoding processing is executed within time ½ the image display time of the one frame with respect to the encoding data of the B-picture.

In the present embodiment, the decoding data of the B-picture are supplied to the output part 31 from the adder 5. Now, it is supposed that the adder 5 supplies the decoding data of the B-picture on the first block line to the switch 32 in blocks. In this case, as shown in FIG. 8A, the switch 32 writes the data of the odd fields of each block data to the memory 34, and writes the data of the even fields to the field memory 36. Thus, only the decoding data of the odd fields of the first block line are stored in the memory 34. Furthermore, the decoding data of the even fields of the first block line are stored in the field memory 36.

Subsequently, the adder 5 outputs the encoding data of the second block line in blocks. In this case, the switch 32 writes the data of the odd fields of each block data to the memory 35. The data of the even fields are additionally written to the field memory 36. Thus, only the decoding data of the odd fields of the second block line are stored in the memory 35. Further, continuously to the decoding data of the even fields on the first block line, the decoding data of the even fields on the second block line are stored in the field memory 36. Moreover, during this period, the switch 33 selects the memory 34. Thus, the data of the odd fields on the first block line which are stored in the memory 34 are read out in the display order and are outputted through the switch 16.

Subsequently, the encoding data on the third block line are outputted from the adder 5 in blocks. In this case, the switch 32 additionally writes the data of the odd fields of each block data to the memory 34. The data of the even fields are additionally written to the field memory 36. Moreover, the switch 33 selects the memory 35, and reads out the data of the odd fields on the second block line, which are stored in the memory 35, in the display order, to output the same from the switch 16. Only the decoding data of the odd fields of the third block line are stored in the memory 34. Continuously to the decoding data of the even fields on the first and second block lines, the decoding data of the even fields on the third block line are stored in the field memory 36.

Subsequently, similar operation is repeated. As shown in FIG. 8B, in a period of the first half of the image display period of one frame, the decoding data of the odd fields are read out from the memories 34 and 35 and are outputted. Moreover, in this period, all the decoding data of the even fields are stored in the field memory 36.

In the latter half of the image display period of one frame, the switch 33 selects the field memory 36. Thus, as shown in FIG. 8C, the decoding data of the even fields which are stored in the field memory 36 are read out in the display order and are outputted from the switch 16. Thus, the interlaced display is made possible.

In this manner, in the present embodiment, the decoding data of the odd fields of each block data are stored in the memories 34 and 35 in the first half of the display period of one frame, and are read out so that the decoding data of the odd fields are obtained. In this period, the decoding data of the even fields are stored in the field memory 36. In the even fields, the data which are stored in the field memory 36 are read out in the display order, to thereby obtain the decoding data of the even fields.

Each of the memories 34 and 35 should have a capacity thereof which stores the data corresponding to the one block. The total memory capacity of the memories 34, 35 and 36 is smaller than that corresponding to one frame. Also in the present embodiment, an attempt can be made to reduce the memory capacity to reduce the circuit scale to reduce the cost.

In connection with the above, each of the above-described embodiments uses a plurality of memories. However, it will be clear that a region of a single memory may be divided into a plurality of regions, and may be used in place of each memory.

FIG. 9 is a bock diagram showing another embodiment of the invention. In FIG. 9, the same reference numerals are applied to constitutional elements the same as those in FIG. 5, and the description thereof will be omitted.

The encoding data are supplied to the code buffer memory circuit 1. The encoding data are created by the DCT processing, the quantization processing and the variable-length encoding processing, and have the I-picture due to the processing within the frame, the P-picture which uses the reference image of the forward or rearward frame, and the B-picture which uses the reference image of the bidirectional frame. Furthermore, the encoding data include also the information of the motion vector which is used upon creation of the P- and B-pictures. In this connection, the DCT processing is executed in block data which are obtained by the blocking processing after the framing.

In the present embodiment, the output from the code buffer memory circuit 1 is adapted to be supplied to the terminal a of the switch 21, the memory 41 and the picture detection circuit 23. The picture detection circuit 23 detects the picture type of the inputted encoding data, to output a detection signal to a buffer control circuit 40.

The buffer control circuit 40 controls the code buffer memory circuit 1 on the basis of the detection signal. Further, the buffer control circuit 40 controls writing and readout of the memory 41 on the basis of the detection signal, and controls changeover of the switch 21. Specifically, in case where it is indicated that the encoding data of the I-picture or the P-picture are outputted from the code buffer memory circuit 1 by the detection signal, the buffer control circuit 40 is adapted to store these encoding data to a memory 41. In case where it is indicated that the encoding data of the B-picture are outputted, the buffer control circuit 40 is adapted such that the switch 21 is caused to select the terminal a so that the encoding data of the B-picture are supplied to the variable-length decoding circuit 2 as they are. The memory 41 is a FIFO (fast-in fast-out) memory, and has a capacity thereof capable of storing the encoding data of the I- and P-pictures. In this connection, the amount of codes of the I- and P-pictures is sufficiently smaller than the amount of data of the picture-element data corresponding to a single frame. The memory 41 should have a capacity thereof about ¼ the frame memory which stores the picture-element data corresponding to the single frame.

Furthermore, the buffer control circuit 40 is adapted to read out the I- and P-pictures which are stored in the memory 41, to supply the same to the variable-length decoding circuit 2 through the terminal b of the switch 21, simultaneously with writing of the encoding data of the I- and P-pictures from the code buffer memory circuit 1. Further, the arrangement is such that, in case where the encoding data of the B-picture are outputted from the code buffer memory circuit 1, the buffer control circuit 40 reads out the encoding data of the P-picture which are stored in the memory 41, preceding thereto, to output the same to a variable-length decoding circuit 42.

The encoding data are given to the variable-length decoding circuit 2 through the switch 21. The variable-length decoding circuit 2 returns the encoding data to the data prior to the variable-length encoding processing on the encoding side by the variable-length decoding processing, to output the same to the inverse quantization circuit 3 and the motion-vector extraction circuit 8. The arrangement including the inverse quantization circuit 3, the inverse DCT circuit 4, the adder 5, the motion-vector extraction circuit 8, the motion compensation circuits 9 and 10, the adder 13 and the switch 15 is similar to that in FIG. 5. In the present embodiment, the output from the adder 5 is given to the frame memories 6 and 11.

The frame memory 11 retains the encoding data from the adder 5 on the basis of the encoding data of the I- and P-pictures, as the forward reference image, and reads out the retained decoding data in the display order to output the same through the switch 16 as the restored image data. Moreover, the frame memory 6 is adapted to retain the output from the adder 5 on the basis of the decoding data of the B-picture, and reads out the retained decoding data in the display order to output the same through the switch 16 as the restored image data. The switch 16 is adapted to be changed over in accordance with the output frame order of the image, to output the restored image data of the sequential frame as the decoding data. Furthermore, the frame memory 11 is adapted to output the reference image data which are retained in the decoding timing of the corresponding P- and B-pictures, to the motion compensation circuit 9.

The present embodiment has decoding processing circuits of two systems. Specifically, the present embodiment is provided with the first decoding processing system which has the variable-length decoding circuit 2, the inverse quantization circuit 3, the inverse DCT circuit 4, the adder 5, the motion-vector extraction circuit 8 and the motion compensation circuit 9, and the second decoding processing system which has the variable-length decoding circuit 42, an inverse quantization circuit 43, an inverse DCT circuit 44, an adder 46, a motion-vector extraction circuit 45 and a motion compensation circuit 47, which are the same in arrangement as the above-described circuits. The second decoding processing system is one for creating the rearward reference image which is necessary for the decoding processing of the first decoding processing system.

The variable-length decoding circuit 42 decodes, in variable length, the encoding data of the P-picture from the memory 41 to output the same to the inverse quantization circuit 43 and the motion-vector extraction circuit 45. Regarding the P-picture, the motion-vector extraction circuit 45 extracts the motion vector which is included in the variable-length decoding output to output the same to the motion compensation circuit 47. The inverse quantization circuit 43 processes, in inverse quantization, the inputted data to give the same to the inverse DCT circuit 44. The inverse DCT circuit 44 processes, in inverse DCT, the inverse quantization output to output the same to the adder 46.

Meanwhile, the arrangement is such that the forward reference image regarding the P-picture which is read out from the memory 41 has already been decoded and has been stored in the frame memory 11. The motion compensation circuit 47 reads out the reference-image data from the frame memory 11, and compensates, in motion, the same on the basis of the motion vector to output the same to the adder 46. The adder 46 is adapted to add the output -from the inverse DCT circuit 44 and the output from the motion compensation circuit 47 to each other to thereby restore the image of the P-picture, to output the same to a terminal a of a switch 49. The forward reference-image data which are read out from the frame memory 11 are supplied to a terminal b of the switch 49. The arrangement is such that the switch 49 selects the terminal a upon decoding of the B-picture to give the rearward reference-image data from the adder 46 to a memory 48, while, in case where the P-picture is decoded by the first decoding processing system, the switch 49 selects the terminal b to give the image data from the frame memory 11 to the memory 48 as the forward reference-image data.

In the present embodiment, the memory 48 is set to a capacity thereof on the basis of the motion compensation range of the reference image. The inverse DCT processing and the inverse quantization processing in decoding are executed in blocks similarly to those upon encoding. Specifically, the adder 5 outputs the restored image data or the predictive error in blocks. Further, the arrangement is such that the motion compensation circuit 9 corrects the position of the reference image which corresponds to the block position of the output from the adder 5 by the motion vector, to output the block data at the corrected position, to thereby compensate, in motion, the reference-image data. Specifically, in consideration of the fact that the blocking position is corrected by the motion vector, the memory 48 should store the reference-image data within a predetermined range including the block position the same as the output from the adder 5. For this reason, in the present embodiment, the arrangement is such that the memory 48 is set to the capacity half the capacity of the picture-element data of the one frame, for example, to retain the decoding data in the range which is in accordance with the position of the decoded block.

The outputs from the motion compensation circuits 9 and 10 are supplied to the switch 15, and are also supplied to the adder 13. The arrangement is such that the adder 13 adds the outputs from the motion compensation circuits 9 and 10 to each other in accordance with the predictive mode to output the same to the switch 15.

Figure 11A:
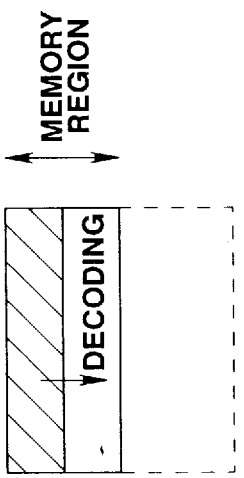
FIGS. 11A–11F are explanatory views for describing operation of the embodiment.
Figure 11B:
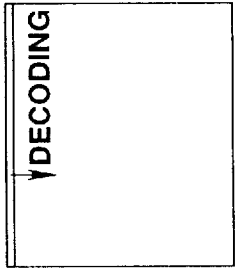
Figure 11C:
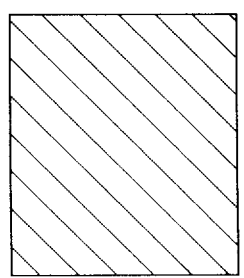

Subsequently, operation of the embodiment arranged in this manner will be described with reference to FIGS. 10A~10F and FIGS. 11A~11F. FIGS. 10A~10F are timing charts for describing the operation of the embodiment. FIG. 10A shows a frame number of the inputted encoding data, while FIG. 10B shows a picture type thereof. FIG. 10C shows the output from the code buffer memory circuit 1, while FIG. 10D shows input and output into and from the memory 41. FIG. 10E shows the rearward or forward reference image of the memory 48, while FIG. 10F shows the forward reference image of the frame memory 11. Further, FIGS. 11A~11F are explanatory views for describing the operation of the embodiment. FIG. 11A shows the forward reference image which is stored in the frame memory 11, by slash lines, and FIG. 11 shows the block position of the decoding data from the adder 5, while FIG. 11C shows the rearward reference image which is stored in the memory 48, by slash lines. Furthermore, FIGS. 11D to 11F correspond respectively to FIGS. 11A to 11C, and show case where the block positions are different from each other.

The encoding data are supplied to the code buffer memory circuit 1. The encoding data have the I-, P- and B-pictures. It is assumed that the encoding data are coded by the predictive method in FIG. 1A, for example, and are inputted in the frame order (FIG. 10A) shown in FIG. 1B. In consideration of the encoding processing time and the output time, the code buffer memory circuit 1 retains the inputted coding data to output the same to the terminal a of the switch 21, the memory 41 and the picture detection circuit 23. First, as shown in FIG. 10A, the encoding data of the I-picture whose frame number is 0 are inputted. The picture detection circuit 23 detects that it is the I-picture, to output the detection signal to the buffer control circuit 40. Thus, the buffer control circuit 40 controls the code buffer memory circuit 1 and controls the memory 41, to read out the encoding data of the I-picture of the frame (0th frame) whose frame number is 0, at timing illustrated in FIG. 10C, to thereby write the same to the memory 41 (FIG. 10D). In the present embodiment, at this point of time, the I-picture is not decoded.

Subsequently, as shown in FIG. 10A, the encoding data of the P-picture of the frame (the third frame) whose frame number is 3 are inputted. The encoding data are read out from the code buffer memory circuit 1 by the buffer control circuit 40 at timing illustrated in FIG. 10C and are written to the memory 41 (FIG. 10D). The memory 41 is a FIFO memory. As shown in FIG. 10D, the buffer control circuit 40 writes the encoding data of the P-picture of the third frame and, simultaneously, reads out the encoding data of the I-picture of the 0th frame to output the same to the variable-length decoding circuit 2 through the terminal b of the switch 21.

The variable-Length decoding circuit 2 decodes, in variable length, the encoding data of the I-picture to output the same to the inverse quantization circuit 3. Moreover, the encoding data are quantized, in inverse, by the inverse quantization circuit 3, and are processed, in inverse DCT, by the inverse DCT circuit 4 so as to be returned to the data prior to the DCT processing on the encoding side to thereby be outputted to the adder 5. In this case, the output from the inverse DCT circuit 4 is the restored image of the 0th frame. In this connection, these processings are executed in blocks. The switch 15 gives 0 to the adder 5. The adder 5 gives the output from the inverse DCT circuit 4 to the frame memory 11 as it is to store the same as the forward reference image (FIG. 10F). Furthermore, the restored image data which are stored in the frame memory 11 are read out in the display order and are outputted through the switch 16.

Subsequently, as shown in FIG. 10A, the encoding data of the B-picture of the frame (the first frame) whose frame number is 1 are inputted. The buffer control circuit 40 outputs the encoding data from the code buffer memory circuit 1 at timing illustrated in FIG. 10C to give the same to the variable-length decoding circuit 2 which forms the first decoding processing system, through the terminal a of the switch 21. Meanwhile, in the present embodiment, the buffer control circuit 40 reads out the encoding data of the P-picture of the third frame from the memory 41, prior to the fact that the encoding data of the first frame are outputted from the code buffer memory circuit 1, to give the same to the variable-length decoding circuit 42 which forms the second decoding processing system. Thus, the decoding processing with respect to the encoding data of the P-picture of the third frame is executed slightly preceding the decoding processing with respect to the encoding data of the B-picture of the first frame and is executed generally in parallel therewith. Specifically, in parallel with the decoding of the B-picture due to the first decoding processing system, the decoding of the P-picture that is the reference image thereof is executed by the second decoding processing system.

The variable-length decoding circuit 42 decodes, in variable length, the inputted encoding data of the P-picture. The inverse quantization circuit 43 and the inverse DCT circuit 44 return the variable-length decoding output to the data prior to the DCT processing to supply the same to the adder 46. Furthermore, the motion-vector extraction circuit 45 extracts the motion vector from the variable-length decoding output to give the same to the motion compensation circuit 47. As shown in FIG. 10F, at this point of time, the frame memory 11 stores the restored image data of the 0th frame that is the reference image of the P-picture of the third frame. The motion compensation circuit 47 compensates, in motion, the reference-image data of the 0th frame which are read out from the frame memory 11, on the basis of the motion vector to give the same to the adder 46. The adder 46 adds the reference-image data which are compensated in motion, to the predictive error from the inverse DCT circuit 44, to restore the image of the third frame in blocks to thereby supply the same to the memory 48 through the switch 49 (FIG. 10E).

Meanwhile, the variable-length decoding circuit 2 decodes, in variable length, the inputted decoding data of the B-picture of the first frame. The inverse quantization circuit 3 and the inverse DCT circuit 4 return the variable-length decoding output to the data prior to the DCT processing to supply the same to the adder 5. Further, the motion-vector extraction circuit 8 extracts the motion vector from the variable-length decoding output to give the same to the motion compensation circuits 9 and 10. FIGS. 11A to 11C show case where the predictive error from the inverse DCT circuit 4 corresponds to the block of the first block line (refer to FIG. 11B) at the upper end of the image plane. At this point of time, as shown in FIG. 10F, the restored image data of the 0th frame that are the forward reference image of the image of the first frame are stored in the frame memory 11 (a slash part in FIG. 11A). Moreover, since the decoding processing of the P-picture is slightly preceding more than the decoding processing of the B-picture, the P-picture of the third frame that becomes the rearward reference image of the image of the first frame is restored to the image data on the upper side of the image plane (including the motion compensation range) including the first block line, as shown in the slash part in FIG. 11C. Accordingly, the motion compensation circuit 10 can compensate, in motion, the rearward reference-image data which are stored in the memory 48. Thus, it is possible to decode the B-picture.

The motion compensation circuits 9 and 10 correct the block positions of the restored image data of the frame memory 11 and the memory 48, respectively, on the basis of the motion vectors, to output the block data which are compensated in motion, to the switch 15 and the adder 13. The adder 13 adds the outputs from the motion compensation circuits 9 and 10 to each other to output the same to the switch 15. In case where the predictive direction of the B-picture of the first frame is Forward, the switch 15 selects the output from the motion compensation circuit 9, while, in case where the predictive direction of the B-picture of the first frame is rearward, the switch 15 selects the output from the motion compensation circuit 10. In case where the predictive directions of the B-picture of the first frame are both directions, the switch 15 selects the output from the adder 13, to output the same to the adder 5 as the reference block data which are compensated in motion. Thus, the adder 5 adds the block data from the inverse DCT circuit 4 and the reference-image data from the switch 15 in blocks to each other to thereby restore the image data of the redetermined block in the first block line to output the same to the frame memory 6.

Figure 11D:
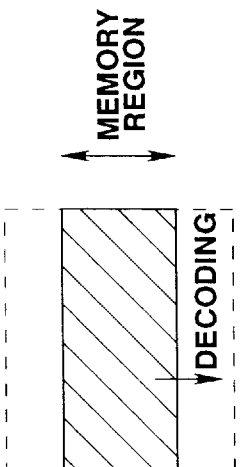
Figure 11E:
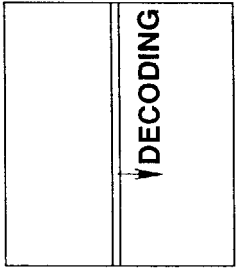
Figure 11F:
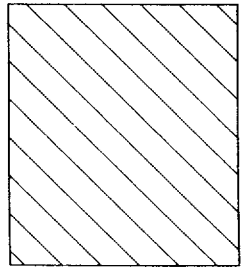

Further, FIGS. 11D to 11F show case where the predictive error from the inverse DCT circuit 4 corresponds to the block of the predetermined single block line (refer to FIG. 11F) on the center of the image plane. Also at this of the time, as shown in FIG. 11D, the frame memory 11 stores the forward reference-image data of the 0th frame. Meanwhile, the memory capacity of the memory 48 is set smaller than that of the frame memory 11. The restored image data of the P-picture of the third frame are written to the memory 48 while being updated. Specifically, at this point of time, as shown by a slash part in FIG. 11F, the substantially center image data in the vertical direction of the image plane, including the objected one block line at the center of the image plane are stored in the memory 48. Also in this case, the range of the image data on the image plane which are stored in the memory 48 is broader than the motion compensation range. Accordingly, in case where the motion compensation circuit 1 corrects the blocking position on the basis of the motion vector, it is possible to read out the block data of the reference image which are compensated in motion, from the memory 48. The motion compensation circuits 9 and 10 read out, respectively, the block data which are compensated in motion, from the memories 11 and 48 to output the same to the switch 15 and the adder 13. The adder 5 adds the output from the inverse DCT circuit 4 and the output from the switch 15 to each other, to output the restored image data regarding each block within the one block line at the center of the image plane, in blocks.

Subsequently, similar operation is repeated whereby the restored image data of the B-picture of the first frame are outputted from the adder 5 in blocks and are stored in the memory 6. The restored image data of the B-picture are framed by the memory 6 and are read out in the display order, and are outputted through the switch 16.

Subsequently, as shown in FIG. 10A, the encoding data of the B-picture of the frame (the second frame) whose frame number is 2 are inputted. The buffer control circuit 40 supplies the encoding data of the B-picture of the second frame to the variable-length decoding circuit 2 through the switch 21 at timing shown in FIG. 10C. Also in this case, the buffer control circuit 40 reads out the encoding data of the P-picture of the third frame which are stored in the memory 41, prior to outputting of the B-picture from the code buffer memory circuit 1 to supply the same to the variable-length decoding circuit 42. Thus, processing similar to that upon the decoding processing of the encoding data of the B-picture of the first frame is executed so that the B-picture of the second frame is decoded. The decoding data are read out, in the display order, from the frame memory 6 and are outputted through the switch 16.

Subsequently, as shown in FIG. 10A, the encoding data of the P-picture of the frame (the sixth frame) whose frame number is 6 are inputted. The encoding data are read out from the code buffer memory circuit 1 by the buffer control circuit 40 at timing shown in FIG. 1C, and are written to the memory 41. The encoding data of the P-picture of the third frame which are stored in the memory 41 are supplied to the variable-length decoding circuit 2 through the terminal b of the switch 21. The predictive error is restored by the variable-length decoding circuit 2, the inverse quantization circuit 3 and the inverse DCT circuit 4.

Meanwhile, the switch 49 selects the terminal b at timing slightly prior to the decoding processing, to supply the restored image data of the 0th frame which are stored in the frame memory 11, to the memory 48 as the reference image. In this case, transmission of the restored image data of the 0th frame to the memory 48 is executed in accordance with the position of the decoding processing block of the P-picture of the third frame, similarly to that upon decoding processing of the B-picture. Specifically, for example, at timing at which the predictive error of the block of the P-picture of the third frame on the first block line (FIG. 11B) is outputted from the inverse DCT circuit 4, as shown in the slash part in FIG. 11C, transmission is executed to the image data including the first block line on the upper side of the image plane. The motion compensation circuit 10 corrects the blocking position of the image data from the memory 48 on the basis of the motion vector, to output the block data of the reference image which is compensated in motion, to the adder 5 through the switch 15. The adder 5 adds the predictive error from the inverse DCT circuit 4 and the block data of the reference image to each other to restore the image of the third frame in blocks, to thereby supply the same to the frame memory 11. Thus, as shown in FIG. 10F, the restored image data of the third frame are stored in the frame memory 11 as the subsequently inputted reference image of the B-picture whose frame numbers are 4 and 5. Further, the restored image data are read out in the display order, and are outputted through the switch 16. Subsequently, similar operation is repeated. The decoding data of the display order are outputted from the switch 16.

In this manner, in the present embodiment, the memory 48 having the small capacity on the basis of the motion compensation range is adopted as a memory for the rearward or forward reference image which is required in case where the encoding data of the B- and P-pictures are processed in decoding. The decoding of the rearward reference image is executed correspondingly to the decoding processing of the B- and P-pictures. The encoding data of the B- and P-pictures are stored in the memory 48. It is possible to reduce the memory capacity less than case where the frame memory is used for the rearward reference image. Thus, it is possible to reduce the circuit scale so that an attempt can be made to reduce the cost.

Figure 12:
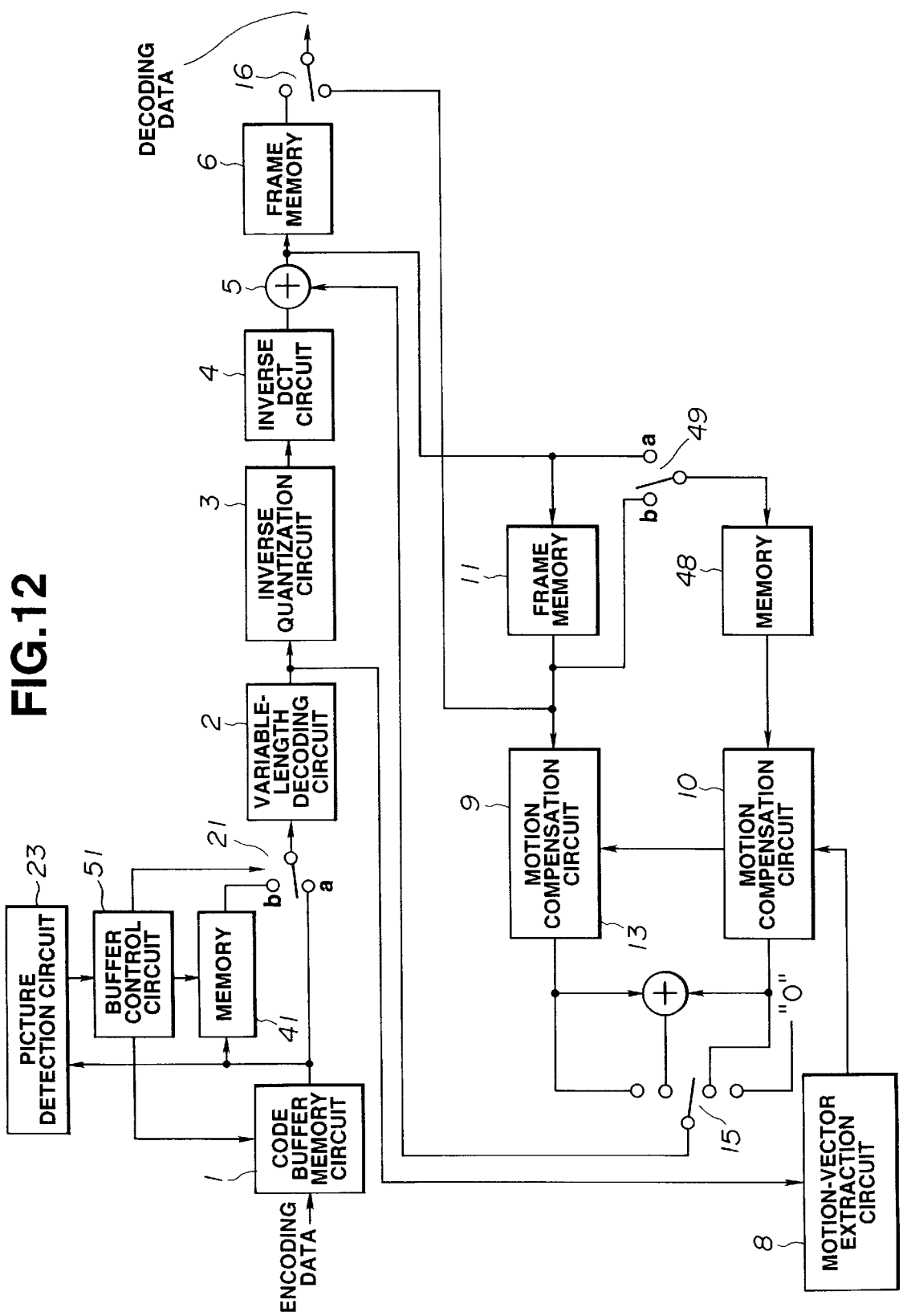
FIG. 12 is a block diagram showing another embodiment of the invention.

FIG. 12 is a block diagram showing another embodiment of the present invention. In FIG. 12, the same reference numerals are applied to constitutional elements the same as those in FIG. 9, and the description thereof will be omitted. In the embodiment in FIG. 9, the decoding processing circuits of two systems are provided. Since, however, the decoding processing circuits of the systems are the same in arrangement as each other, sharing is possible by execution of time-sharing or time-division processing. The present embodiment is so arranged as to prevent the circuit scale from increasing by the time-division processing.

The present embodiment is different from the embodiment in FIG. 9 in that the variable-length decoding circuit 42, the inverse quantization circuit 43, the inverse DCT circuit 44, the adder 46, the motion-vector extraction circuit 45 and the motion compensation circuit 47 are deleted, a buffer control circuit 51 is used in place of the buffer control circuit 40 to supply the encoding data read out from the memory 41, to the variable-length decoding circuit 2 through the terminal b of the switch 21, and the output from the adder 5 is given to the memory 48 through the terminal a of the switch 49. The buffer control circuit 51 controls the code buffer memory circuit 1 on the basis of the detection signal. Moreover, in case where it is indicated that the encoding data of the I-picture or the P-picture are outputted from the code buffer memory circuit by the detection signal, the buffer control circuit 51 causes these encoding data to be stored in the memory 41. While, in case where it is indicated that the encoding data of the B-picture are outputted, the buffer control circuit 51 causes the switch 21 to select the terminal a to supply the encoding data of the B-picture to the variable-length decoding circuit 2 as they are.

Furthermore, the arrangement is such that, simultaneously with writing of the encoding data of the I- and P-pictures from the code buffer memory circuit 1, the buffer control circuit 51 reads out the I- and P-pictures which are stored in the memory 41, to supply the same to the variable-length decoding circuit 2 through the terminal b of the switch 21. Further, the arrangement is such that, in case where the encoding data of the B-picture are read out from the code buffer memory circuit 1 and are supplied to the variable-length decoding circuit 2, the buffer control circuit 51 initiates or starts readout of the encoding data of the P-picture which are stored in the memory 41, prior to the readout, to output the same to the variable-length decoding circuit 2, and the readout is executed in one block in time division, for example.

In this manner, in the present embodiment, the arrangement is such that the decoding processing of the P- and B-pictures and the decoding processing of the P-picture of the rearward reference image are executed in time division. For example, regarding the NTSC image, the sampling frequency is generally set to 13.5 MHz. On the contrary, the operation speed of the present integrated circuit is sufficiently fast. In case where a circuit the same as prior-art one is used for the decoding processing in the present embodiment, the time-division processing is sufficiently possible.

Subsequently, operation of the embodiment arranged in this manner will be described.

In the present embodiment, control due to the buffer control circuit 51 and writing and readout controls of the frame memory 11 and the memory 48 are different from those in the embodiment in FIG. 9. It is supposed that the encoding data illustrated in FIGS. 10A and 10B are inputted to the code buffer memory circuit 1. In the present embodiment, readout from the code buffer memory circuit 1 is similar to that in the embodiment in FIG. 9. Specifically, the encoding data of the I-picture of the 0th frame which are inputted first are read out from the code buffer memory circuit 1 at timing shown in FIG. 10C by the buffer control circuit 51. The buffer control circuit 51 writes the encoding data to the memory 41. Subsequently, when the encoding data of the P-picture of the third frame are outputted from the code buffer memory circuit 1, the buffer control circuit 51 writes the encoding data of the P-picture of the third frame to the memory 41 while the encoding data of the I-picture are read out from the memory 41. The encoding data of the I-picture are given to the variable-length decoding circuit 2 through the terminal a of the switch 21 and are decoded in variable length. Thus, the restored image data of the 0th frame are obtained from the inverse DCT circuit 4. The image data are stored in the frame memory 11 as the forward reference-image data, are read out from the frame memory 11 in the display order and are outputted from the switch 16.

Subsequently, the buffer control circuit 51 reads out the encoding data of the P-picture of the third frame from the memory 41 for creation of the rearward reference image prior to the fact that the encoding data of the B-picture of the first frame are outputted from the code buffer memory circuit 1. In the present embodiment, the encoding data of the P-picture from the memory 41 are supplied to the variable-length decoding circuit 2 through the terminal b of the switch 21. In this manner, the predictive error of the P-picture of the third frame is obtained from the inverse DCT circuit 4. Meanwhile, the motion compensation circuit 9 blocks the restored image data of the 0th frame which are stored in the frame memory 11, at the blocking position on the basis of the motion vector, to output the same to the adder 5 through the switch 15. The adder 5 adds the output From the inverse DCT circuit 4 and the output from the switch 15 to each other to output the restored image data of the third frame in blocks.

In this case, the switch 49 is caused to select the terminal a to successively write the restored image data from the adder 5, to the memory 48. Thus, when the decoding data till the range (the slash part in FIG. 11C) which is required for decoding the blocks of the first block line shown in FIG. 11B are written to the memory 48, the buffer control circuit 51 stops readout from the memory 41 and outputs the B-picture from the code buffer memory circuit 1 to supply the same to the variable-length decoding circuit 2 through the terminal a of the switch 21. In this manner, the predictive error of the first block of the first block line of the first frame is obtained from the inverse DCT circuit 4. The forward reference-image data of the first frame are stored in the frame memory 11. The necessary rearward reference-image data are stored in the memory 48. The motion compensation circuits 9 and 10 block the image data of these memories 11 and 48 at the blocking position on the basis of the motion vector to output the same. The block data of the reference image which are compensated in motion are given to the adder 5 from the switch 15 and are added to the predictive error from the inverse DCT circuit 4, to thereby obtain the restored image data of the first block. The image data are stored in the frame memory 6.

Subsequently, the buffer control circuit 51 stops readout of the B-picture from the code buffer memory circuit 1, and reads out the P-picture which is stored in the memory 41, to supply the same to the variable-length decoding circuit 2 through the terminal b of the switch 21. In this case, the forward reference-image data which are stored in the frame memory 11 are used so that the decoding is executed. Subsequently, readout is changed over to the code buffer memory circuit 1 and the memory 41 in one block, and the decoding processing of the B-picture and the decoding processing of the P-picture that is the rearward reference image are alternately executed. Thus, in case of execution of decoding regarding the predetermined block of the B-picture, the rearward reference-image data of the motion compensation range including the block are already decoded and are stored in the memory 48. In this manner, the B-picture is decoded, and the restored image data are read out from the frame memory 6 in the display order. Subsequently, similarly, the B-picture of the second frame is also decoded.

In case where the P-picture of the sixth frame is decoded, the switch 49 is caused to select the terminal b prior to the fact that the encoding data of the P-picture are outputted from the code buffer memory circuit 1. The reference-image data of the third frame which are stored in the frame memory 11 are read out, and are written to the memory 48 till the range (the slash part in FIG. 11C) which is required for decoding the block of the first block line shown in FIG. 11B. Subsequently, decoding of the P-picture is executed, and the decoding data are written to the frame memory 11 in blocks. Simultaneously with the writing, subsequent data are read out from the frame memory 11 and are transmitted to the memory 48. Subsequently, similar operation is repeated, and decoding of the P-picture of the sixth frame is executed.

In this manner, also in the present embodiment, it is possible to obtain advantages similar to those of the embodiment in FIG. 9. Further, by sharing of the circuit, it is possible to reduce the circuit scale less than that in the embodiment in FIG. 9.

Figure 13:
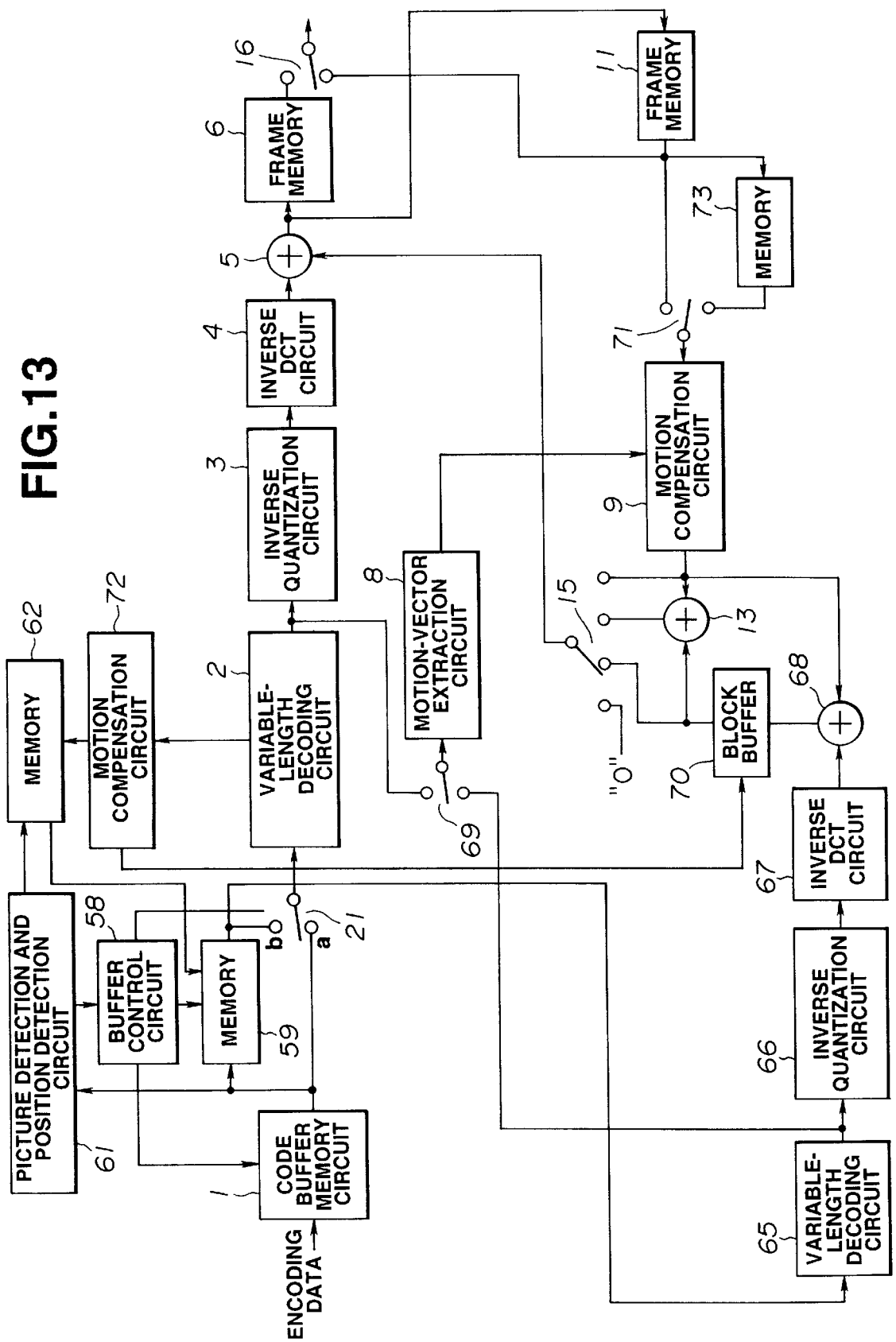
FIG. 13 is a block diagram showing another embodiment of the invention.

FIG. 13 is a block diagram showing another embodiment of the present invention. In FIG. 13, the same reference numerals are applied to constitutional elements the same as those in FIG. 9, and the description thereof will be omitted.

The encoding data are supplied to the code buffer memory circuit 1. The encoding data are created by the DCT processing, the quantization processing and the variable-length encoding processing, and have the I-picture due to the processing within the frame, the P-picture which uses the reference image of the forward or rearward frame, and the B-picture which uses the reference image in the bidirectional frame. Moreover, the encoding data include also the information of the motion vector, which is used upon creation of the P- and B-pictures. In this connection, the DCT processing is executed in block data which are obtained by the blocking processing after framing.

The code buffer memory circuit 1 retains the inputted encoding data to execute time setting between the decoding processing time and the output processing time, to output the same. In the present embodiment, the arrangement is such that the output from the code buffer memory circuit 1 is supplied to the terminal a of the switch 21, a memory 59 and a picture detection and position detection circuit 61. The picture detection and position detection circuit 61 detects the picture type of the inputted encoding data, to output the detection signal to a buffer control circuit 58.

The buffer control circuit 58 controls the code buffer memory circuit 1 on the basis of the detection signal. Moreover, the buffer control circuit 58 controls writing and readout of the memory 59 on the basis of the detection signal, and controls changeover of the switch 21. Specifically, in case where it is indicated that the encoding data of the I-picture or the P-picture are outputted from the code buffer memory circuit 1 by the detection signal, the buffer control circuit 58 stores these encoding data to the memory 59. In case where it is indicated that the encoding data of the B-picture are outputted, the switch 21 is caused to select the terminal a so that the encoding data of the B-picture are supplied to the variable-length decoding circuit 2 as they are. The memory 59 is a FIFO memory, and has a capacity thereof capable of storing the encoding data of the I- and P-pictures. In this connection, an amount of codes of the I- and P-pictures is sufficiently smaller than the amount of data of the picture element data corresponding to one frame. The memory 59 should have a capacity thereof which is about ¼ the frame memory which stores the picture element data corresponding to one frame.

Figures 14, 15:
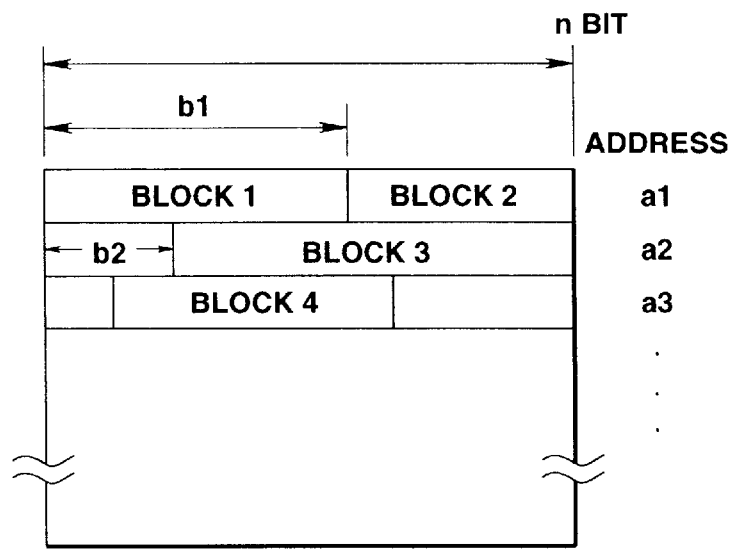
FIG. 14 is an explanatory view for describing a memory region of a memory 59 in FIG. 13.
FIG. 15 is an explanatory view for describing a memory region of a memory 62 in FIG. 13.

FIG. 14 is an explanatory view for describing the memory region of the memory 59 in FIG. 13.

The memory 59 has a plurality of regions each of which has a bit length n as shown in FIG. 14. The arrangement is such that each of these regions is assigned by addresses a1, a2, . . . The encoding data are processed in blocks. Writing is executed to the memory 59 in blocks. The encoding data are variable-length codes, and the block lengths of the respective blocks are different from each other. As shown in FIG. 14, the data of the first block (block 1) are arranged in the memory 59 successively from the top of the address a1. For example, in FIG. 14, it is shown that the data of the block 1 are written from the top of the address a1 only by b1 bit and, successively, the data of the block 2 are arranged from the top of the address a2 to the position of b2 bit.

In the present embodiment, the picture detection and position detection circuit 61 detects the block length and the block start position of each block, from the encoding data of the I- and P-pictures, to thereby detect the position (hereinafter referred to as "start position") on the memory of the block which is stored in the memory 59 to write the same to the memory 62.

FIG. 15 is an explanatory view for describing the memory region of the memory 62 in FIG. 13.

As shown in FIG. 15, the memory 62 has addresses corresponding respectively to the blocks. As shown in FIG. 15, the address on the memory 59 of each block and the bit start position thereof are stored in each address. The picture detection and position detection circuit 61 supplies the number of the block of the inputted I- and P-pictures to the memory 62 as address, and stores, in the address, the data of the address and the bit start position of the memory 59 to which the block data are stored. For example, in FIG. 15, it is indicated that the block data of the block 1 are stored from the top of the address a1 of the memory 59, and the block data of the block 2 are stored from the b1 bit of the address a1 of the memory 59.

The buffer control circuit 58 is so arranged as to write the encoding data of the I- and P-pictures from the code buffer memory circuit 1 and, simultaneously, to read out the I- and P-pictures which are stored in the memory 59, to supply the same to the variable-length decoding circuit 2 through the terminal b of the switch 21. Furthermore, the arrangement is such that, in case where the encoding data of the B-picture are outputted from the code buffer memory circuit 1, the buffer control circuit 58 reads out the encoding data of the P-picture which are stored in the memory 59, on the basis of the information of the start position which is supplied from the memory 62, to output the same to the variable-length decoding circuit 65.

The encoding data are given to the variable-length decoding circuit 2 through the switch 21, and are returned to the data prior to the variable-length coding processing on the encoding side by the variable-length decoding processing. The output from the variable-length decoding circuit 2 is supplied to the inverse quantization circuit 3, and is supplied to the motion-vector extraction circuit 8 through a switch 69. The arrangement is such that a variable-length decoding output. from a variable-length decoding circuit 65 to be described later is also supplied to the motion-vector extraction circuit 8, through the switch 69. The motion-vector extraction circuit 8 extracts the motion vector which is included in the variable-length decoding output, regarding the P- and B-pictures, to output the same to the motion compensation circuit 9.

The arrangement of the inverse quantization circuit 3, the inverse DCT circuit 4 and the adder 5 is similar to that illustrated in FIG. 9. The switch 15 adds 0 to the adder 5 in case where the output from the inverse DCT circuit 4 is based on the I-picture, while the switch 15 adds the output from the motion compensation circuit 9 to the adder 5 in case where the output from the inverse DCT circuit 4 is based on the P-picture. The switch 15 adds the outputs from the motion compensation circuit 9 and a block buffer 70 to be described later or the output from the adder 13 to the adder 5.

The frame memory 11 retains the encoding data from the adder 5 on the basis of the encoding data of the I- and P-pictures, as the forward reference image, and reads out the retained decoding data in the display order to output the same through the switch 16 as the restored image data. The arrangement is such that the frame memory 11 outputs the reference image data which are retained at the decoding timing of the corresponding P- and B-pictures to the motion compensation circuit 9 through a switch 71. The motion compensation circuit 9 compensates, in motion, the reference image data from the frame memory 11 on the basis of the motion vector from the motion-vector extraction circuit 8 to output the same. The output from the motion compensation circuit 9 is supplied to the switch 15 and is also supplied to the adders 13 and 68.

The present embodiment has decoding processing circuits of two systems. Specifically, the present embodiment is provided with a first decoding processing system having the variable-length decoding circuit 2, the inverse quantization circuit 3, the inverse DCT circuit 4 and the adder 5, and a second decoding processing system having the variable-length decoding circuit 65, an inverse quantization circuit 66, an inverse DCT circuit 67 and the adder 68, which are the same in arrangement as these circuits. In connection with this, the motion-vector extraction circuit 8 and the motion compensation circuit 9 are shared to the first decoding processing system and the second decoding processing system. The second decoding processing system is provided for creating the rearward reference image which is required for the decoding processing of the first decoding processing system.

By the way, the inverse DCT processing and the quantization processing in the decoding are executed in blocks similar to those upon encoding. Specifically, the reference image which is supplied to the adder 5 from the switch 15 is the block data. Accordingly, in case where the decoding of the predetermined block is executed, a memory should be had which stores the image data of the blocks within the motion compensation range, including the position corresponding to the block. Furthermore, if the amount of motion correction and a direction thereof are found, it is possible to further reduce the range of the rearward reference image which is required to be stored in the memory, in the decoding of the first decoding processing system.

For this reason, in the present embodiment, the arrangement is such that the block which is used as the rearward reference image is decided on the basis of the motion vector of the decoding block. Specifically, the motion vector which is decoded by the variable-length decoding circuit 2 is given to a motion compensation circuit 72. The arrangement is such that the motion compensation circuit 72 detects the block number which is required as the reference image, from the motion vector, to output the same to a memory 62 as an address. The arrangement is also such that the memory 62 gives the information of the start position which is stored in the assigned address, to the memory 59, to Output the corresponding block data from the memory 59.

The variable-length decoding circuit 65 decodes, in variable length, the encoding data of the P-picture from the memory 59 to output the same to the inverse quantization circuit 66, and outputs the same also to the motion-vector extraction circuit 8 through the switch 69. The inverse quantization circuit 66 processes, in inverse quantization, the inputted data to give the same to the inverse DCT circuit 67. The inverse DCT circuit 67 processes, in inverse DCT, the inverse quantization output to output the same to the adder 68.

Meanwhile, the arrangement is such that the forward reference image regarding the P-picture which is read out from the memory 59 is already decoded and is stored in the frame memory 11. As described above, also in the second decoding processing system, the arrangement is such that the motion-vector extraction circuit 8 and the motion compensation circuit 9 are used. At decoding processing timing due to the second decoding processing system, the motion compensation circuit 9 reads out the reference image data from the frame memory 11 and compensates, in motion, the same on the basis of the motion vector to output the same to the adder 68. Specifically, the motion compensation circuit 9 corrects the blocking position of the decoding block on the basis of the motion vector to block the reference image at the corrected position, to thereby obtain the block data of the reference image which is compensated in motion. The arrangement is such that the adder 68 adds the output from the inverse DCT circuit 67 and the output from the motion compensation circuit 9 to each other to thereby obtain the restored image regarding the block of the P-picture selected by the memory 62, in blocks, to output the same to the block buffer 70 as the block data of the rearward reference image.

Depending upon the motion vector, the block data which are compensated in motion span the original four blocks.

Accordingly, the block buffer 70 should have a capacity thereof capable of storing the block data of the four blocks. The block buffer 70 blocks the stored rearward reference-image data, on the basis of the blocking positional information from the motion compensation circuit 72 to output the same to the adder 13 and the switch 15. The arrangement is such that the adder 13 adds the outputs from the motion compensation circuit 9 and the block buffer 70 to each other in accordance with the predictive mode, to output the same to the switch 15.

In connection with the above, the arrangement is such that the output from the frame memory 11 is also given to a memory 73. The arrangement is such that, in case where the P-picture is decoded by the first decoding processing system, the memory 73 stores the image data from the frame memory 11 as the forward reference-image data. As described above, in consideration of the fact that the blocking position is corrected by the motion vector, the memory 73 should have a capacity thereof which stores the reference-image data within the predetermined range including the block position the same as the output from the adder 5. The arrangement is such that the switch 71 selects the terminal b only in case where the P-picture is decoded by the first decoding processing system, to output the inputted image data to the motion compensation circuit 9.

Figure 16:
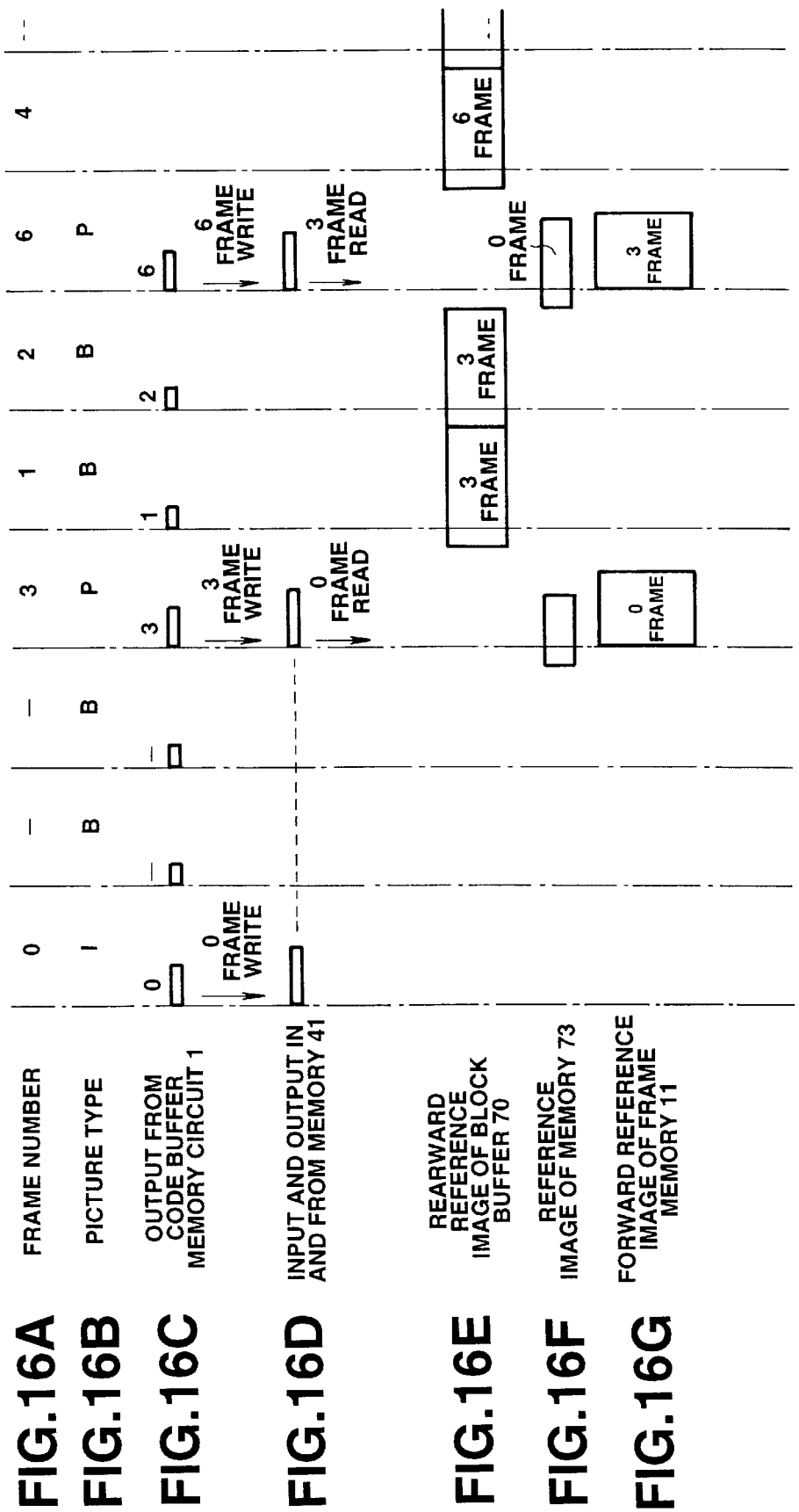
FIGS. 16A to 16G are timing charts for describing operation of the embodiment.
Figure 17:
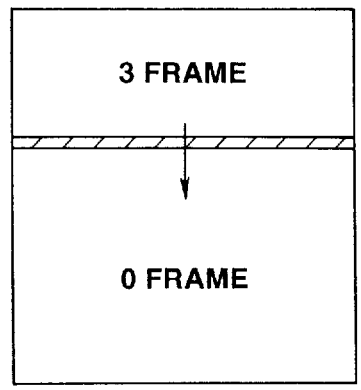
FIGS. 17A and 17B are explanatory views for describing operation of the embodiment.
Figure 17:
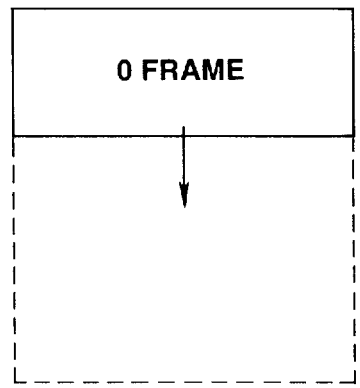

Subsequently, operation of the embodiment arranged in this manner will be described with reference to FIGS. 16A to 16G and FIGS. 17A and 17B. FIGS. 16A to 16G are timing charts for describing the operation of the embodiment. FIG. 16A shows the frame number of the inputted encoding data, and FIG. 16B shows a picture type thereof, while FIG. 16C shows the output from the code buffer memory circuit 1. FIG. 16D shows input and output to and from the memory 59, while FIG. 16E shows the rearward reference image of the block buffer 70. FIG. 16F shows the reference image of the memory 73 and FIG. 16G shows tie forward reference image of the frame memory 11. Further, FIGS. 17A and 17B are explanatory views for describing operation of the embodiment. FIG. 17A shows readout from the frame memory 11 upon decoding of the P-picture, while FIG. 17B shows writing to the memory 73 in this case.

The encoding data are supplied to the code buffer memory circuit 1. The encoding data have the I-, P- and B-pictures. It is assumed that, for example, the encoding data are encoded by the predictive method in FIG. 1A and are inputted in the frame order shown in FIG. 1B (FIG. 16A). In consideration of the encoding processing time and the output time, the code buffer memory circuit 1 retains the inputted encoding data to output the same to the terminal a of the switch 21, the memory 59 and the picture detection and position detection circuit 61. First, as shown in FIG. 16A, the encoding data of the I-picture whose frame number is 0 are inputted. The picture detection and position detection circuit 61 detects as being the I-picture to output a detection signal to the buffer control circuit 58. Thus, the buffer control circuit 58 controls the code buffer memory circuit 1 and controls the memory 59 to read out the encoding data of the I-picture of the 0th frame at timing shown in FIG. 16C to write the same to the memory 59 (FIG. 16D). In the present embodiment, at this point of time, the I-picture is not decoded.

Subsequently, as shown in FIG. 16A, the encoding data of the P-picture of the third frame are inputted. The encoding data are read out from the code buffer memory circuit 1 by the buffer control circuit 58 at timing shown in FIG. 16C, and are written to the memory 59 (FIG. 16D). The memory 59 is a FIFO memory. As shown in FIG. 16D, the buffer control circuit 58 writes the encoding data of the P-picture of the third frame and, simultaneously, reads out the encoding data of the I-picture of the 0th frame to output the same to the variable-length decoding circuit 2 through the terminal b of the switch 21. Meanwhile, the picture detection and position detection circuit 61 detects the block length of the encoding data and the start position of the block to write the same to the memory 62.

The variable-length decoding circuit 2 decodes, in variable length, the encoding data of the I-picture to output the same to the inverse quantization circuit 3. Further, the encoding data are quantized, in inverse, by the inverse quantization circuit 3, are processed, in inverse DCT, by the inverse DCT circuit 4, are returned to the data prior to the DCT processing on the encoding side, and are outputted to the adder 5. In this case, the output from the inverse DCT circuit 4 is the restored image of the 0th frame. In this connection, these processings are executed in block. The switch 15 gives 0 to the adder 5. The adder 5 gives the output from the inverse DCT circuit 4 to the frame memory 11 as it is to store the same as the forward reference image (FIG. 16G). Moreover, the restored image data which are stored in the frame memory 11 are read out in the display order and are outputted through the switch 16.

Subsequently, as shown in FIG. 16A, the encoding data of the B-picture of the first frame are inputted. The buffer control circuit 58 outputs the encoding data from the code buffer memory circuit 1 at timing illustrated in FIG. 16C, and gives the same to the variable-length decoding circuit 2 which forms the first decoding processing system, through the terminal a of the switch 21.

The variable-length decoding circuit 2 decodes, in variable length, the encoding data of the B-picture to output the same to the motion compensation circuit 72. The motion compensation circuit 72 extracts the motion vector from the variable-length decoding output to output the block shown by the motion vector, as the address of the memory 62. In this case, four blocks are assigned as an address, to the maximum, with respect to a single decoding block.

The memory 62 outputs the information of the start position which is stored in the assigned address, to the memory 62. For example, it is supposed that the third and mth blocks which are adjacent to each other, of the reference image of the third frame are assigned by the motion vector of the first encoding block of the encoding data of the first frame. Then, as shown in FIG. 15, for example, the memory 62 assigns the third block which is stored subsequent to the b2 bit of the address a2 of the memory 59, to output the block data thereof, and to output the block data of the region which stores the mth block. The block data which are read out from the memory 59 are given to the variable-length decoding circuit 65.

In this manner, slightly preceding the decoding processing of the B-picture of the first frame due to the first decoding processing system and in parallel therewith, the decoding processing of the rearward reference image of the third frame due to the second decoding processing system is executed. The variable-length decoding circuit 65 decodes, in variable length, the encoding data of the inputted P-picture. Moreover, the variable-length decoding output is returned to the data prior to the DCT processing by the inverse quantization circuit 66 and the inverse DCT circuit 67 and is supplied to the adder 68. Furthermore, the variable-length decoding output is given to the motion-vector extraction circuit 8 through the switch 69, and the motion-vector extraction circuit 8 extracts the motion vector to give the same to the motion compensation circuit 9. As shown in FIG. 16C, at this point of time, the frame memory 11 stores the restored image data of the 0th frame that are the reference image of the P-picture of the third frame. The motion compensation circuit 9 compensates, in motion, the reference-image data of the 0th frame which are read out from the frame memory 11, on the basis of the motion vector to give the same to the adder 68. The adder 68 adds the reference-image data which are compensated in motion, to the predictive error from the inverse DCT circuit 67, to restore the image of the predetermined block of the third frame in blocks to thereby supply the same to the block buffer 70 (FIG. 16E). Similarly, only the block of the P-picture which is required for the decoding processing of the decoding block of the B-picture is processed, in decoding, and is stored in the block buffer 70.

Meanwhile, the output from the variable-length decoding circuit 2 is returned to the data prior to the DCT processing by the inverse quantization circuit 3 and the inverse DCT circuit 4 and is supplied to the adder 5. Moreover, the variable-length decoding output is given to the motion-vector extraction circuit 8 through the switch 69. The motion-vector extraction circuit 8 extracts the motion vector to give the same to the motion compensation circuit 9. The restored image data of the 0th frame that are the forward reference image of the image of the first frame are stored in the frame memory 11 (FIG. 16G). Further, the rearward reference image of the image of the first frame is stored in the block buffer 70 (FIG. 16E).

The motion compensation circuit 9 corrects the blocking position of the restored image data in the frame memory 11, on the basis of the motion vector, to output the block data which are compensated in motion, to the switch 15 and the adder 13. Moreover, the block buffer 70 blocks the stored rearward reference-image data on the basis of the blocking positional information from the motion compensation circuit 72 to give the block data which are compensated in motion, to the switch 15 and the adder 13.

The adder 13 adds the outputs from the motion compensation circuit 9 and the block buffer 70 to each other to output the same to the switch 15. In case where the predictive direction of the B-picture of the first frame is forward, the switch 15 selects the output from the motion compensation circuit 9, while, in case where the predictive direction of the B-picture of the first frame is rearward, the switch 15 selects the output from the block buffer 70. In case where the predictive directions of the B-picture of the first frame are both directions, the switch 15 selects the output from the adder 13 to output the same to the adder 5 as the reference block data which are compensated in motion. Thus, the adder 5 adds the block data from the inverse DCT circuit 4 and the reference-image data from the switch 15 in blocks to each other to thereby restore the image data of the first frame in blocks to output the same to the frame memory 6.

Subsequently, similar operation is repeated whereby the restored image data of the B-picture of the first frame are outputted from the adder 5 in blocks, to store the same to the memory 6. The restored image data of the B-picture are framed by the memory 6, are read out in the display order, and are outputted through the switch 16.

Subsequently, as shown in FIG. 16A, the encoding data of the B-picture of the second frame are inputted. The buffer control circuit 58 supplies the encoding data of the B-picture of the second frame to the variable-length decoding circuit 2 through the switch 21 at timing shown in FIG. 16C. Also in this case, the motion compensation circuit 72 assigns the block of the rearward reference image which is required for the decoding processing of each block data of the second frame, to the memory 62, on the basis of the motion vector. The memory 62 assigns the readout position of the memory 59. The memory 59 reads out the block data from the assigned position to supply the same to the variable-length decoding circuit 65.

In this manner, the decoding processing of the P-picture of the third frame is executed in the second decoding processing system, preceding the decoding processing of the predetermined block data of the B-picture of the second frame. When the rearward reference image which is required for the decoding processing is stored in the block buffer 70, the decoding processing of the B-picture of the second frame is executed in the first decoding processing system. The decoding data of the second frame are read out in the display order from the frame memory 6 and are outputted through the switch 16.

Subsequently, as shown in FIG. 16A, the encoding data of the P-picture of the sixth frame are inputted. The encoding data are read out from the code buffer memory circuit 1 at timing shown in FIG. 19C by the buffer control circuit 58 and are written to the memory 59. The encoding data of the P-picture of the third frame which are stored in the memory 59 are supplied to the variable-length decoding circuit 2 through the terminal b of the switch 21. The predictive error is restored by the variable-length decoding circuit 2, the inverse quantization circuit 3 and the inverse DCT circuit 4.

Meanwhile, the frame memory 11 gives the restored image data of the 0th frame to the memory 73 as the reference image, at timing slightly prior to the decoding processing. In this case, similarly to time upon the decoding processing of the B-picture, transmission of the restored image data of the 0th frame to the memory 73 is executed in accordance with the position of the decoding processing block of the P-picture of the third frame. Specifically, for example, till timing at which the predictive error of the block of the first block line of the P-picture of the third frame is outputted from the inverse DCT circuit 4, the data till the image data in the motion compensation range on the upper side of the image plane including the first block line are transmitted to the memory 73. The motion compensation circuit 9 corrects the blocking position of the image data from the memory 73 on the basis of the motion vector, to output the block data of the reference image which are compensated in motion, to the adder 5 through the switch 15. The adder 5 adds the predictive error from the inverse DCT circuit 4 and the block data of the reference image to each other to restore the image of the third frame in blocks, to thereby supply the same to the frame memory 11.

Thus, as shown in FIG. 17A, the restored image data of the 0th frame which have already been stored in the frame memory 11 are successively updated by the restored image data of the third frame. In this connection, a slash part in FIG. 17A shows the block line which executes writing. As shown in FIG. 17B, together with the updating, the restored image data of the 0th frame which are stored in the frame memory 11 are successively transmitted to the memory 73.

Subsequently, similar operation is repeated to decode the P-picture of the third frame. As shown in FIG. 16G, the restored image data of the third frame are stored in the frame memory 11 as the reference image of the B-picture whose frame numbers are 4 and 5, which is inputted subsequently. Further, the restored data are read out in the display order and are outputted through the switch 16. Subsequently, similar operation is repeated. The decoding data of the display order are outputted from the switch 16.

In this manner, in the present embodiment, the block buffer 70 corresponding to four blocks, to the maximum, on the basis of the motion compensation range is adopted as a memory for the rearward reference image which is required in case where the encoding data of the B- and P-pictures are processed in decoding. As a memory for the forward reference image, the frame memory 11 and the memory 73 which is small in capacity on the basis of the motion compensation range are adopted. The decoding of the rearward reference image is executed correspondingly to the decoding processing of the B- and P-pictures, and it is stored in the block buffer 70. In this manner, it is possible to reduce the memory capacity less than case where the frame memory is used for the rearward reference image. Thus, an attempt can be made to reduce the circuit scale to reduce the cost.

Figure 18:
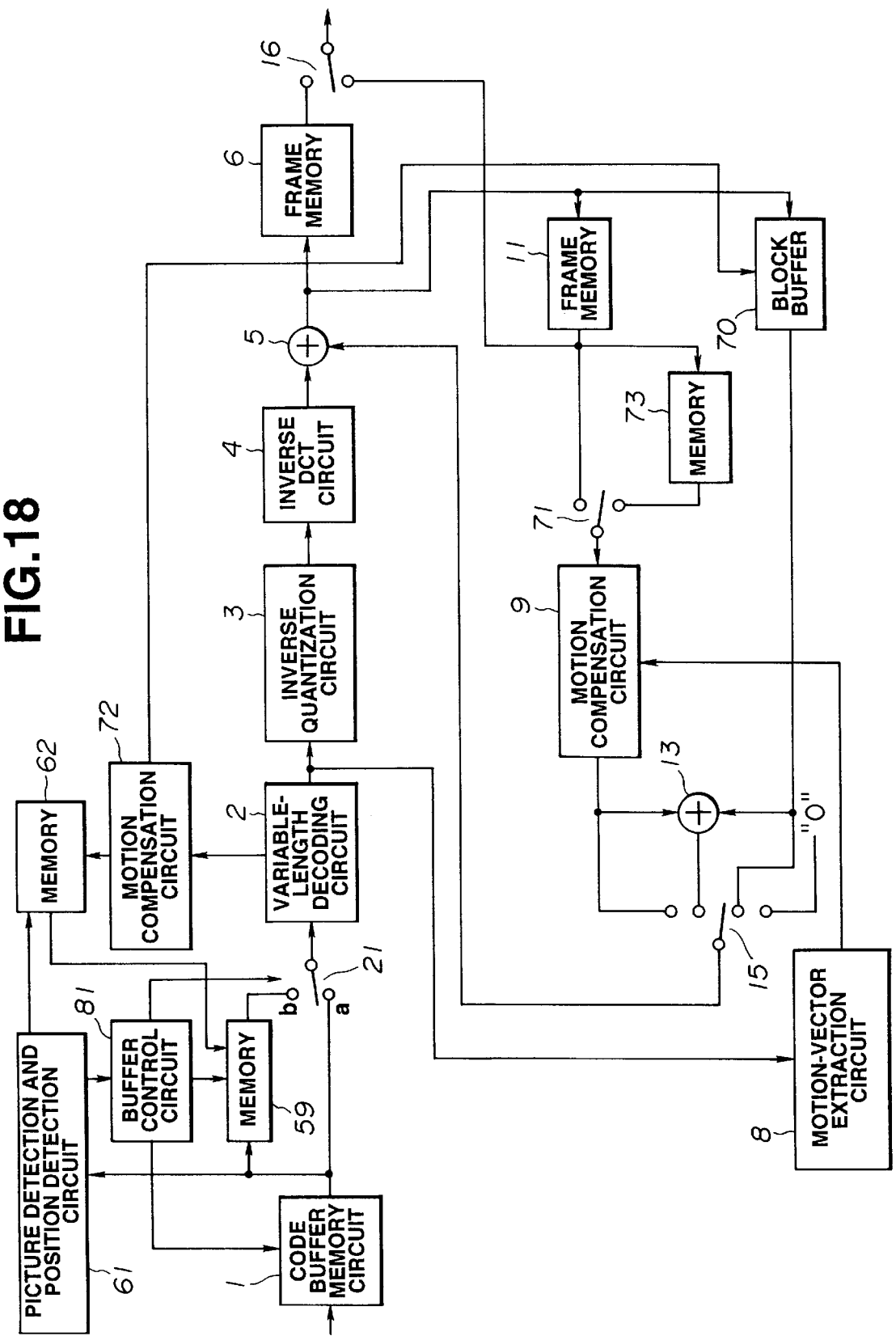
FIG. 18 is a block diagram showing the other embodiment of the invention.

FIG. 18 is a block diagram showing another embodiment of the invention. In FIG. 18, the same reference numerals are applied to constitutional elements the same as those in FIG. 13, and the description thereof will be omitted. In the embodiment shown in FIG. 13, the decoding processing circuit for the two systems is provided. Since, however, the decoding processing circuit in one system is the same in arrangement as that in the other system, sharing is possible by execution of time-division processing. The present embodiment is so arranged as to prevent the circuit scale from increasing by the time-division processing.

The present embodiment is different from the embodiment in FIG. 13 in that the present embodiment omits the variable-length decoding circuit 65, the inverse quantization circuit 66, the inverse DCT circuit 67 and the adder 68, and uses a buffer control circuit 81 in place of the buffer control circuit 58 to supply the encoding data which are read out from the memory 59, to the variable-length decoding circuit 2 through the terminal b of the switch 21. The buffer control circuit 81 controls the code buffer memory circuit 1 on the basis of the detection signal. Moreover, in case where it is indicated that the encoding data of the I-picture or the P-picture are outputted from the code buffer memory circuit 1 by the detection signal, the buffer control circuit 81 stores these encoding data to the memory 59. In case where it is indicated that the encoding data of the B-picture are outputted, the buffer control circuit 81 causes the switch 21 to select the terminal a to supply the encoding data of the B-picture to the variable-length decoding circuit 2 as they are.

Furthermore, the arrangement is such that, simultaneously with the writing of the encoding data of the I- and P-pictures from the code buffer memory circuit 1, the buffer control circuit 81 reads out the I- and P-pictures which are stored in the memory 59, to supply the same to the variable-length decoding circuit 2 through the terminal b of the switch 21.

In the present embodiment, the arrangement is such that the decoding processing of the P- and B-pictures and the decoding processing of the P-picture of the rearward reference image are executed in time division. For example, regarding the NTSC image, the sampling frequency is generally set to 13.5 MHz. On the contrary, the motion speed of the present integrated circuit is sufficiently fast. Also in case where a circuit the same as that of the conventional or prior-art one is used for the decoding processing in the present embodiment, it is possible to sufficiently execute the time-division processing.

Subsequently, operation of the embodiment arranged in this manner will be described.

In the present embodiment, control due to the buffer control circuit 81 and writing and readout control of the frame memory 11. and the block buffer 70 are different from those in the embodiment illustrated in FIG. 13. It is supposed that the encoding data shown in FIGS. 16A and 16B are inputted to the code buffer memory circuit 1. In the present embodiment, readout from the code buffer memory circuit 1 is similar to that of the embodiment shown in FIG. 13. Specifically, the encoding data of the I-picture of the 0th frame which are first inputted are read out from the code buffer memory circuit 1 by the buffer control circuit 81 at timing shown in FIG. 16C. The buffer control circuit 81 writes the encoding data to the memory 59. Subsequently, when the encoding data of the P-picture of the third frame are outputted from the code buffer memory circuit 1, the buffer control circuit 81 writes the coding data of the P-picture of the third frame to the memory 59 while reading out the encoding data of the I-picture from the memory 59. Further, the picture detection and position detection circuit 61 gives the information showing the start position of each block data, to the memory 62, to cause the memory 62 to store the same.

The encoding data of the I-picture are given to the variable-length decoding circuit 2 through the terminal a of the switch 21 and are decoded in variable length. Thus, it is possible to obtain the restored image data of the 0th frame from the inverse DCT circuit 4. The image data are stored in the frame memory 11 as the forward reference-image data. The image data are read out on the display order from the frame memory 11 and are outputted from the switch 16.

Subsequently, the buffer control circuit 81 outputs the encoding data of the B-picture of the first frame from the code buffer memory circuit 1, to give the same to the variable-length decoding circuit 2 through the terminal a of the switch 21. The variable-length decoding circuit 2 decodes, in variable length, the B-picture. The motion compensation circuit 72 detects the rearward motion vector to assign the block of the rearward reference image which is required for decoding the B-picture. The memory 62 gives the information of the start position of the assigned block to the memory 59, to read out the block data of the P-picture of the third frame from the memory 59. In the present embodiment, the encoding data of the P-picture from the memory 59 are supplied to the variable-length decoding circuit 2 through the terminal b of the switch 21. In this manner, the predictive error of the P-picture of the third frame is obtained from the inverse DCT circuit 4. Meanwhile, the motion compensation circuit 9 blocks the restored image data of the 0th frame which are stored in the frame memory 11, at the blocking position on the basis of the motion vector, to output the same to the adder 5 through the switch 15. The adder 5 adds the output from the inverse DCT circuit 4 and the output from the switch 15 to each other to output the restored image data of the third frame in blocks.

In this case, the restored image data of the third frame from the adder 5 are successively written to the block buffer 70. Thus, when the predetermined blocks of the rearward reference image of four blocks, to the maximum, which are required for decoding the B-picture of the first frame are written to the block buffer 70, the buffer control circuit 81 outputs the B-picture from the code buffer memory circuit 1 to suppLy the same to the variable-length decoding circuit 2 through the terminal a of the switch 21. In this manner, the predictive error of the first block of the first block line of the first frame is obtained from the inverse DCT circuit 4. The forward reference-image data of the first frame are stored in the frame memory 11. The required rearward reference-image data are stored in the block buffer 70. The motion compensation circuit 9 and the block buffer 70 output the block data which are compensated in motion. The block data of the reference image which are compensated in motion are given to the adder 5 from the switch 15, and are added to the predictive error from the inverse DCT circuit 4, to thereby obtain the restored image data of the first block. The image data are stored in the frame memory 6.

Subsequently, the buffer control circuit 81 reads out the second block data of the B-picture from the code buffer memory circuit 1 to give the same to the variable-length decoding circuit 2. The block of the P-picture which is required for decoding the block data is detected by the motion compensation circuit 72. The switch 21 selects the terminal b, to read out the block data of the P-picture from the memory 59. The decoding data of the block data are stored in the block buffer 70 and are made to the rearward reference image. Subsequently, the buffer control circuit 81 causes the switch 21 to select the terminal a, to read out the second block data of the B-picture from the code buffer memory circuit 1 to thereby give the same to the variable-length decoding circuit 2. At this point of time, the forward reference-image data are stored in the frame memory 11, and the rearward reference-image data are stored in the block buffer 70. Thus, decoding processing of the second block data is executed.

Subsequently, readout is changed over between the code buffer memory circuit 1 and the memory 59 in a single block, and decoding processing of the B-picture and decoding processing of the P-picture that is the rearward reference image are executed alternately. In this manner, the B-picture is decoded, and the restored image data are read out from the frame memory 6 in the display order. Subsequently, similarly, the B-picture of the second frame is also decoded.

In case where the P-picture of the sixth frame is decoded, the reference-image data of the third frame which are stored in the frame memory 11 are read out and are stored in the memory 73. Thus, writing is executed to the memory 73 to a range which is required for decoding the block of the first block line of the P-picture of the sixth frame. Subsequently, decoding of the B-picture is executed to write the decoding data to the frame memory 11 in blocks. Simultaneously with the writing, subsequent data are read out from the frame memory 11 arid are transmitted to the memory 73. Subsequently, similar operation is repeated whereby decoding of the P-picture of the sixth frame is executed.

In this manner, also in the present embodiment, it is possible to obtain advantages similar to those in the embodiment shown in FIG. 13. Moreover, by sharing of the circuit, it is possible to reduce the circuit scale less than that in the embodiment in FIG. 13.

In this invention, it is apparent that working modes different in a wide range can be formed on the basis of this invention without the departure from the spirit and scope of the invention. This invention is not restricted by any specific embodiments except being limited by the appended claims.

What is claimed is:

1. An image decoding apparatus comprising:
   decoding means to which encoding data including bidirectional predictive encoding data which use forward and rearward reference images are inputted, for decoding inputted encoding data in predetermined blocks to output decoding data;
   memory means for retaining said inputted bidirectional predictive encoding data;
   control means for successively giving said inputted bidirectional predictive encoding data and bidirectional predictive encoding data which are stored in said memory means, to said decoding means, to cause decoding processings regarding the same bidirectional predictive encoding data to be executed twice;
   first output means for retaining decoding data due to first decoding processing regarding said bidirectional predictive encoding data from said decoding means, corresponding to at least one block line, and for outputting decoding data of one field of the retained decoding data, in display order; and
   second output means for retaining decoding data due to second decoding processing regarding said bidirectional predictive encoding data from said decoding means, corresponding to at least one block line, and for outputting the decoding data of the other field of the retained decoding data, in display order.

2. An image decoding apparatus according to claim 1, wherein said first and second output means output, respectively, said decoding data in half the image display time of one frame.

3. An image decoding apparatus according to claim 1, wherein said first and second output means have first and second memories for retaining the decoding data corresponding to one block line, and wherein writing and readout of said first and second memories are controlled whereby the decoding data of said one field and said other field are outputted in display order.

4. An image decoding apparatus comprising:
   decoding means responsive to encoding data which includes bidirectional predictive encoding data associated with forward and rearward reference images, for decoding said encoding data in predetermined blocks and outputting successive decoding data;
   first memory means connected at least indirectly to said decoding means, for storing I-frame data which defines an entire block of an independent frame, said I-frame data being derived from said successive decoding data;
   second memory means connected at least indirectly to said decoding means, for storing P-frame data which defines an entire block of a unidirectionally predicted frame, said P-frame data being derived from a combination of said I-frame data and unidirectional predictive decoding data contained in said successive decoding data;
   third memory means connected at least indirectly to said decoding means, for storing B-frame data defining an entire block of a bidirectionally predicted frame derived from a combination of said I-frame data, said P-frame data and bidirectional predictive decoding data contained in said successive decoding data;
   said first, second, and third memory means having a total memory capacity which is less than that which would be required to simultaneously store all of said B-frame data, P-frame data, and I-frame data for an entire I-frame block, B-frame block and P-frame block; and
   a switching circuit for controlling access to and from said first, second, and third memory means such that said B-frame data, P-frame data and I-frame data are outputted in display order, said third memory being arranged with respect to said switching circuit such that B-frame data is outputted from a memory element of said third memory while additional B-frame data is stored into another memory element of said third memory means, thereby permitting said third memory means to have a smaller memory capacity than that which would be required to store B-frame data for an entire block of a bidirectionally predicted frame.

5. The image decoding apparatus of claim 4, wherein each of said memory elements has a total memory capacity which is no larger than that which would be required to store the B-frame data corresponding to one line in a block of a bidirectionally predicted frame;

said switching circuit being arranged such that B-frame data corresponding to one line in a block of a bidirectionally predicted frame are stored alternatingly in said memory elements;

said switching circuit being further arranged so as to alternatingly output contents of said memory elements, the contents being outputted from each memory element during an interval of time between storage of the B-frame data, said contents being output in display order, temporally between contents from said first and second memory means.

6. The image decoding apparatus of claim 5, wherein said switching circuit is arranged so as to output contents from said first memory corresponding to said I-frame data, and thereafter alternatingly output contents of said memory elements until the B-frame data corresponding to at least one block of a bidirectionally predicted frame has been outputted, and then outputting the contents from said second memory corresponding to said P-frame data.

\* \* \* \* \*